(12) United States Patent
Harada et al.

(10) Patent No.: US 11,661,523 B2
(45) Date of Patent: May 30, 2023

(54) INK, INK ACCOMMODATING UNIT, RECORDING METHOD, RECORDING DEVICE, AND METHOD OF MANUFACTURING INK

(71) Applicant: RICOH COMPANY, LTD., Tokyo (JP)

(72) Inventors: Shigeyuki Harada, Shizuoka (JP); Takuya Yamazaki, Kanagawa (JP); Takuya Saiga, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 566 days.

(21) Appl. No.: 16/791,473

(22) Filed: Feb. 14, 2020

(65) Prior Publication Data
US 2020/0263049 A1    Aug. 20, 2020

(30) Foreign Application Priority Data
Feb. 14, 2019 (JP) ............................ JP2019-024532

(51) Int. Cl.
*C09D 11/326* (2014.01)
*C08F 220/14* (2006.01)
(Continued)

(52) U.S. Cl.
CPC ......... *C09D 11/326* (2013.01); *B41J 2/17503* (2013.01); *B41J 2/17509* (2013.01);
(Continued)

(58) Field of Classification Search
CPC ... C09D 11/326; C09D 11/033; C09D 11/324; C09D 11/38; C09D 11/36; C09D 11/322;
(Continued)

(56) References Cited

U.S. PATENT DOCUMENTS

2008/0250973 A1* 10/2008 Leenders ............. B42D 25/378
347/100
2014/0132684 A1*  5/2014 Ohta .................... B41M 7/009
347/102

(Continued)

FOREIGN PATENT DOCUMENTS

JP    H02-197102    8/1990
JP    2012-1581     1/2012
(Continued)

OTHER PUBLICATIONS

Japanese Office Action dated Jul. 26, 2022, in Japanese Application No. 2019-024532, with English translation, 6 pages.
(Continued)

*Primary Examiner* — Manish S Shah
(74) *Attorney, Agent, or Firm* — Grüneberg and Myers PLLC

(57) ABSTRACT

An ink contains water, a pigment, and a polymer having a structure unit represented by the following Chemical structure 1, Chemical structure 1 where $R_1$ represents an organic group having at least carbon and oxygen.

18 Claims, 1 Drawing Sheet

(51) Int. Cl.
*C08F 212/08* (2006.01)
*B41J 2/175* (2006.01)
*C08G 77/14* (2006.01)
*C08G 77/388* (2006.01)
*B41J 2/21* (2006.01)
*C08F 220/28* (2006.01)
*B41J 29/13* (2006.01)
*C09D 11/322* (2014.01)
*B41J 29/02* (2006.01)

(52) U.S. Cl.
CPC ......... *B41J 2/17523* (2013.01); *B41J 2/2107* (2013.01); *B41J 2/2114* (2013.01); *B41J 29/02* (2013.01); *B41J 29/13* (2013.01); *C08F 212/08* (2013.01); *C08F 220/14* (2013.01); *C08F 220/287* (2020.02); *C08G 77/14* (2013.01); *C08G 77/388* (2013.01); *C09D 11/322* (2013.01); *B41J 2/17553* (2013.01)

(58) Field of Classification Search
CPC ......... C09D 11/40; C09D 11/30; C09D 11/32; C09D 11/328; C09D 11/101; C09D 11/102; C09D 11/005; C09D 11/54; C09D 11/52; C09D 11/106; B41J 2/14; B41J 2202/01; B41J 25/001; B41J 25/34; B41J 25/003; B41J 2/21; B41J 25/312; B41J 2025/008; B41J 2202/21; B41J 2/17596; B41J 2/16508; B41J 2/1652; B41J 2/16538; B41J 2/175; B41J 2/17563; B41J 2/1433; B41J 2/1623; B41J 2202/00; B41J 2202/03; B41J 2/14201; B41J 2/045; B41J 11/0015; B41J 11/002; B41J 2/04581; B41J 2/055; B41J 2002/16502; B41J 2/04588; B41J 2/04595; B41J 2/04586; B41J 2/14274; B41J 2/01; B41J 2/211; B41J 2/17; B41J 2/17593; B41J 2/2107; B41J 2/1755; B41J 2/2114; B41J 2/2117; B41J 2/2056; B41J 2/0057; B41J 3/60; B41J 2002/012; B41J 2/04598; B41M 5/0023; B41M 5/00; B41M 5/0011; B41M 5/0017; B41M 5/0047; B41M 7/00; B41M 7/0072; B41M 5/52; B41M 5/5218; B41M 5/5227
See application file for complete search history.

(56) References Cited

U.S. PATENT DOCUMENTS

| | | | |
|---|---|---|---|
| 2014/0141209 A1* | 5/2014 | Koizuka | C09D 11/324 524/88 |
| 2014/0198160 A1 | 7/2014 | Harada et al. | |
| 2014/0347716 A1* | 11/2014 | Nagahara | C09D 11/106 359/290 |
| 2016/0017075 A1 | 1/2016 | Harada et al. | |
| 2016/0032037 A1 | 2/2016 | Harada et al. | |
| 2016/0075892 A1 | 3/2016 | Harada et al. | |
| 2016/0102162 A1 | 4/2016 | Harada et al. | |
| 2016/0168292 A1 | 6/2016 | Fukuoka et al. | |
| 2016/0362572 A1* | 12/2016 | Matsuyama | B41J 29/13 |
| 2017/0073533 A1 | 3/2017 | Fukuoka et al. | |
| 2017/0158794 A1 | 6/2017 | Harada et al. | |
| 2018/0002469 A1 | 1/2018 | Harada et al. | |
| 2018/0002553 A1 | 1/2018 | Harada et al. | |
| 2019/0276694 A1* | 9/2019 | Yamazaki | B41J 2/01 |
| 2019/0322888 A1* | 10/2019 | Ciampini | C09D 11/328 |

FOREIGN PATENT DOCUMENTS

| | | |
|---|---|---|
| JP | 2012-21040 | 2/2012 |
| JP | 2016-196621 | 11/2016 |
| JP | 2018-076531 | 5/2018 |
| JP | 2018-104545 | 7/2018 |

OTHER PUBLICATIONS

Japanese Office Action dated Jan. 5, 2023, in Japanese Application No. 2019-024532, with English translation, 7 pages.

* cited by examiner

INK, INK ACCOMMODATING UNIT, RECORDING METHOD, RECORDING DEVICE, AND METHOD OF MANUFACTURING INK

CROSS-REFERENCE TO RELATED APPLICATIONS

This patent application is based on and claims priority pursuant to 35 U.S.C. § 119 to Japanese Patent Application No. 2019-024532, filed on Feb. 14, 2019, in the Japan Patent Office, the entire disclosure of which is hereby incorporated by reference herein.

BACKGROUND

Technical Field

The present invention relates to an ink, an ink accommodating unit, a recording method, a recording device, and a method of manufacturing an ink.

Description of the Related Art

Inkjet recording methods are advantageous in comparison with other recording methods in that the process is simple, full colorization is easy, and high definition images can be obtained by a device having a simple configuration. For this reason, inkjet recording is widely employed from home use to office use, commercial printing, and industrial printing. As the ink for use in inkjet recording, as for the coloring material, dye ink including water-soluble dyes are mainly used. Also, pigment ink including a non-water-soluble pigment has been developed to enhance water-resistance and light resistance.

When a pigment is used as a coloring material, it is necessary to consider dispersibility, meaning uniformly and stably dispersing a pigment in an ink vehicle and other properties such as storage stability, meaning a long-term storage of an ink at a high temperature of 70 degrees C. or lower and discharging stability, meaning stably discharging ink with a discharging nozzle of an ink head without curing a pigment.

Further, as usage of inkjet is spreading from office use to commercial printing and industrial printing, high productivity is required for printed matter, which requires high-speed printing and high-speed drying. For high-speed drying, it is necessary to increase drying efficiency by devising a drying device or raise the drying temperature to 100 degrees C. or higher when drying efficiency is the same. However, when the drying temperature is increased, pigment dispersion discharged from an ink head in an ink droplet on the surface of paper surface is destroyed and the pigment is aggregated and unevenly distributed, resulting in a significant decrease in image density.

SUMMARY

According to embodiments of the present disclosure, provided is an ink which contains water, a pigment, and a polymer having a structure unit represented by the following Chemical structure 1,

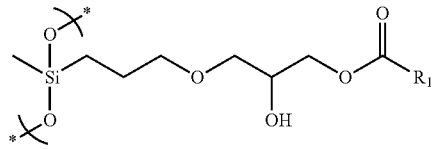

Chemical structure 1 where $R_1$ represents an organic group having at least carbon and oxygen.

BRIEF DESCRIPTION OF THE SEVERAL VIEWS OF THE DRAWINGS

Various other objects, features and attendant advantages of the present invention will be more fully appreciated as the same becomes better understood from the detailed description when considered in connection with the accompanying drawings in which like reference characters designate like corresponding parts throughout and wherein.

Figure 1:
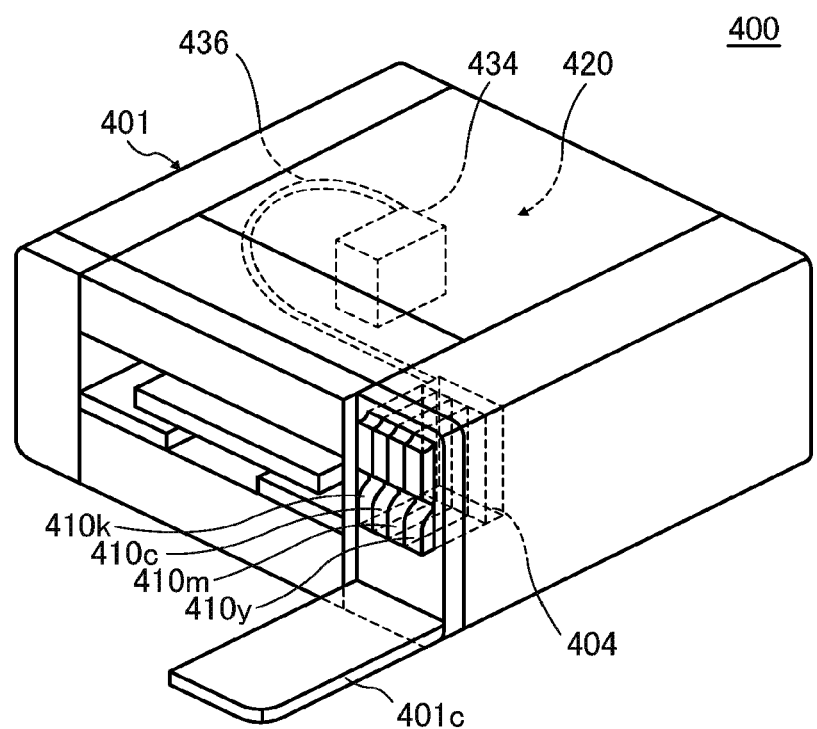
FIG. 1 is a diagram illustrating a perspective view of an example of a recording device.

The accompanying drawings are intended to depict example embodiments of the present invention and should not be interpreted to limit the scope thereof. The accompanying drawings are not to be considered as drawn to scale unless explicitly noted. Also, identical or similar reference numerals designate identical or similar components throughout the several views.

DESCRIPTION OF THE EMBODIMENTS

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

As used herein, the singular forms "a", "an", and "the" are intended to include the plural forms as well, unless the context clearly indicates otherwise.

Moreover, image forming, recording, printing, modeling, etc., in the present disclosure represent the same meaning, unless otherwise specified.

Embodiments of the present invention are described in detail below with reference to accompanying drawing(s). In describing embodiments illustrated in the drawing(s), specific terminology is employed for the sake of clarity. However, the disclosure of this patent specification is not intended to be limited to the specific terminology so selected, and it is to be understood that each specific element includes all technical equivalents that have a similar function, operate in a similar manner, and achieve a similar result.

For the sake of simplicity, the same reference number will be given to identical constituent elements such as parts and materials having the same functions and redundant descriptions thereof omitted unless otherwise stated.

As a pigment dispersion having excellent initial dispersibility, storage stability, and discharging stability, an aqueous pigment dispersion satisfying a specific cross-linking condition has been proposed in 2018-76531-A1 which is composed of a water-insoluble polymer containing a structure unit derived from a carboxylic group-containing monomer and a structure unit derived from a nonionic monomer and has a cross-linking structure obtained by reacting with a water-insoluble polyfunctional epoxy compound.

Further, an aqueous pigment dispersion satisfying a specific cross-linking condition has been proposed in JP-2018-104545-A1 which is obtained by reaction between a water-insoluble polymer having a carboxy group and having an acid value of from 200 to 300 mg/kg and a water-insoluble polyfunctional epoxy compound.

Although there are proposals for improving storage stability and discharging stability, there is no means for preventing the reduction in image density ascribable to high-temperature drying.

According to the present disclosure, an ink is provided which is capable of preventing a decrease in image density caused by high temperature drying.

Embodiments of the present disclosure are described in detail below, but the present disclosure is not limited thereto.

Embodiment 1 of the present disclosure is an ink which contains water, a pigment, and a polymer having a structure unit represented by the following Chemical structure 1,

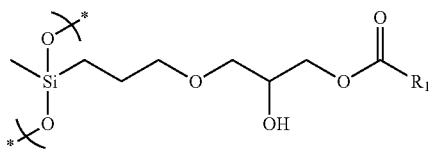

Chemical structure 1 where R1 represents an organic group having at least carbon and oxygen.

In the following, Embodiment 1 of the present disclosure will be described in detail. Embodiment 1 includes the following Embodiments 2 to 9 below, which is also described in detail.

2. The ink according to 1 mentioned above, wherein $R_1$ has a structure unit represented by the following Chemical structure 2.

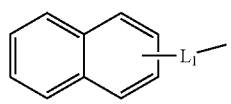

Chemical structure 2

In Chemical structure 2, $L_1$ represents —O—, —CO—, —OC(=O)— (naphthalene side) or —NHCO— (naphthalene side).

3. The ink according to 1 mentioned above, wherein $R_1$ has a structure unit represented by the following Chemical structure 3.

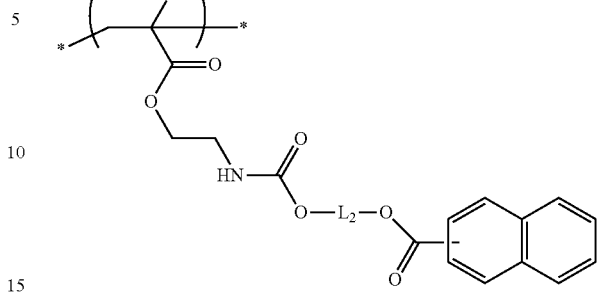

Chemical structure 3

In Chemical structure 3, $L_2$ represents an alkylene group having 2 to 18 carbon atoms and $R_2$ represents a hydrogen atom or a methyl group.

4. An ink accommodating unit mentioned above includes a container and the ink of any one of 1 to 3 mentioned above contained in the container.

5. A recording method includes discharging the ink of any one of 1 to 3 mentioned above to a recording medium to form an image thereon.

6. A recording device includes an ink accommodating unit configured to accommodate the ink of any one of 1 to 3 mentioned above and a discharging device configured to discharge the ink accommodated in the ink accommodating unit to a recording medium.

7. A method of manufacturing an ink includes mixing water, a compound represented by the following Chemical structure 4, a compound represented by the Chemical structure 5, and a pigment to react the compound represented by the following Chemical structure 4 and the compound represented by the Chemical structure 5 to obtain the ink containing water, a pigment, and a polymer having a structure unit represented by the following Chemical structure 1.

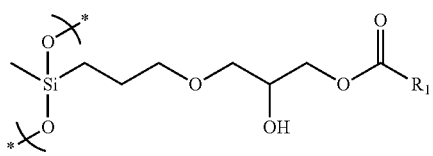

Chemical structure 1

In Chemical structure 1, $R_1$ represents an organic group having at least carbon and oxygen.

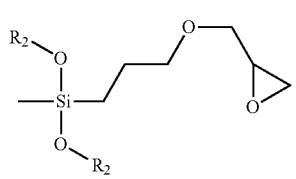

Chemical structure 4

In Chemical structure 4, where $R_2$ represents a methyl group or an ethyl group.

Chemical structure 5

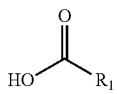

Chemical structure 5 -continued

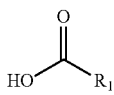

In Chemical structure 5, $R_1$ represents an organic group having at least carbon and oxygen.

8. The method according to 7 mentioned above, wherein, in the mixing, the proportion of the compound represented by the Chemical structure 4 to the compound represented by the Chemical structure 5 is from 1 to 40 percent by mass.

9. The method according to 7 mentioned above, wherein, in the mixing, the proportion of the compound represented by the Chemical structure 4 to the compound represented by the Chemical structure 5 is from 5 to 20 percent by mass.

Ink

The ink of the present disclosure contains water, a pigment, a polymer, and other optional components such as an organic solvent and additives. The polymer has a structure unit represented by the following structure 1. In Chemical structure 1, $R_1$ represents an organic group having at least carbon and oxygen.

Chemical structure 1

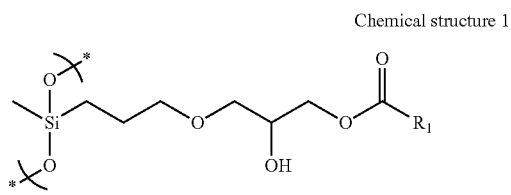

Polymer

In the polymer having the structure unit represented by the Chemical structure 1, the organic groups $R_1$ can be linked to each other in a branched manner via a linking group —(O—Si—O)—, so that flowability of the organic group $R_1$ against heat is reduced. That is, the polymer having the structure unit represented by the Chemical structure 1 existing close to the pigment has good stability (heat resistance) against heat during high-temperature drying, so that aggregation between the pigments is prevented, thereby preventing a decrease in the image density.

The proportion of the polymer in the ink is preferably from 0.1 to 10 percent by mass and more preferably from 0.5 to 5 percent by mass.

The polymer having the structure unit represented by the Chemical formula 1 is preferably synthesized from at least a compound represented by the Chemical structure 4 and a compound represented by the Chemical structure 5. In the Chemical structure 4, $R_2$ is a methyl group or an ethyl group and in the Chemical structure 5, $R_1$ is an organic group containing at least carbon and hydrogen.

Chemical structure 4

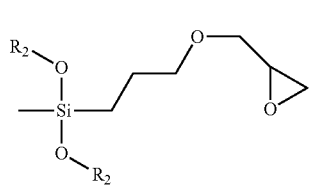

That is, in the polymer having the structure unit of the Chemical structure 1, the alkoxysilane portion of the compound represented by the Chemical structure 4 is hydrolyzed by adding water to form silanol, and the silanol is condensed, thereby forming the polysiloxane portion of the Chemical structure 1. Also, the glycidyl group of the compound represented by the Chemical structure 4 reacts with the carboxylic acid represented by the Chemical structure 5 to form the ester portion of the Chemical structure 1.

$R_1$ in the Chemical structure 1 and the Chemical structure 5 is not limited as long as $R_1$ is adsorbed to a pigment and is an organic group having at least carbon and hydrogen with a capability of dispersing the pigment in water.

Specific examples of the compound represented by the Chemical structure 5 include, but are not limited to, polymers or copolymers composed of acrylic acid, methacrylic acid, maleic acid, monomethyl maleate, itaconic acid, monomethyl itaconate, or fumaric acid. Specific examples of the monomers as the copolymerizable components include, but are not limited to, unsaturated ethylene monomers having an aromatic ring such as α-methylstyrene, 4-t-butyl styrene, and 4-chloromethylstyrene; and unsaturated ethylene monomers having an alkyl group such as 1-heptene, 3,3-dimethyl-1-pentene, 4,4-dimethyl-1-pentene, 3-methyl-1-hexene, 4-methyl-1-hexene, 5-methyl-1-hexene, 1-octene, 3,3-dimethyl-1-hexene, 3,4-dimethyl-1-hexene, 4,4-dimethyl-1-hexene, 1-nonene, 3,5,5-trimethyl-1-hexene, 1-decene, 1-undecene, 1-dodecene, 1-tridecene, 1-tetradecene, 1-pentadecene, 1-hexadecene, 1-heptadecene, 1-octadecene, 1-nonadecene, 1-eicocene, and 1-dococene, anionic unsaturated ethylene monomers such as 4-styrenesulfonic acid and 2-acrylamide-2-methylpropane sulfonic acid, nonionic unsaturated ethylene monomers such as 2-hydroxyethyl (meth)acrylate, diethylene glycol mono(meth)acrylate, triethylene glycol mono(meth)acrylate, tetraethylene glycol mono(meth)acrylate, polyethylene glycol mono(meth)acrylate, (meth)acrylamide, N-methylol (meth)acrylamide, N-vinylformamide, N-vinylacetamide, N-vinylpyrrolidone, acrylamide, N,N-dimethylacrylamide, N-butylacrylamide, N-octylacrylamide, and N-t-octylacrylamide.

Further, it is preferable that $R_1$ in the Chemical structure 1 and the Chemical structure 5 preferably have a structural unit represented by the Chemical structure 2 in terms of the pigment dispersibility. In the Chemical structure 2, $L_1$ represents —O—, —CO—, —OC(=O)— (on the naphthalene side), or —NHCO— (on the naphthalene side). The naphthyl group in the Chemical structure 2 is easily adsorbed to a pigment due to π-π stacking and facilitates pigment dispersion.

Chemical structure 2

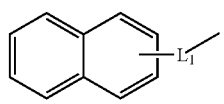

Further, it is preferable that $R_1$ in the Chemical structure 1 and the Chemical structure 5 preferably have a structural unit represented by the Chemical structure 3 in terms of the storage stability. In the Chemical structure 3, $L_2$ represents an alkylene group having 2 to 18 carbon atoms and $R_2$ represents a hydrogen atom or a methyl group. Since the naphthyl group adsorbed to a pigment is present at the terminal of the main chain via an ester group, a urethane group, and an alkyl group, the pigment tends to be more stably present in the vehicle, thereby demonstrating better storage stability.

Chemical structure 3

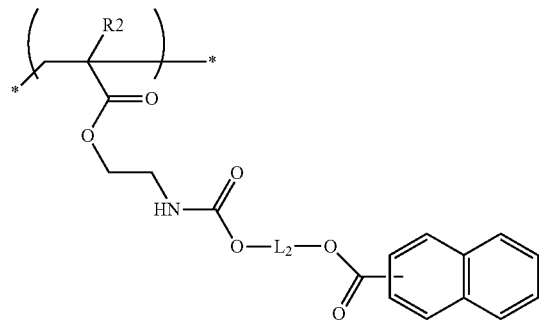

The compound represented by the Chemical structure 4 is capable of imparting a cross-linking structure to the compound represented by the Chemical structure 5 and forms a polymer having a structure unit represented by the Chemical structure 1. Therefore, as the amount of the compound represented by the Chemical structure 4 increases to the amount of the compound represented by the Chemical structure 5, the cross-linking density of the polymer having the structure unit represented by the Chemical structure 1 can be increased. To prevent printed matter from being destroyed by a physical force, it is necessary that pigments in ink droplets are fused on the surface of paper while the pigments are fused onto each other via a drying process after the ink droplets land on the surface of paper. When the cross-linking density of the polymer having the structure unit represented by the Chemical structure 1 is low, the force of fusing the pigment and the paper and the pigments themselves increases. However, it is not sufficient in terms of resistance against a physical force. In addition, if the cross-linking density is too high, the force of fusing the pigment and the paper and the pigments themselves also decreases, which is not preferable in terms of resistance against a physical force. The proportion of the compound represented by the Chemical structure 4 to the compound represented by the Chemical structure 5 is preferably from 1 to 40 percent by mass. More preferably, it is from 5 to 20 percent by mass.

Further, to sufficiently dissolve the compound represented by the Chemical structure 5, the compound represented by the Chemical structure 5 is added to an alkali aqueous solution in which a sufficient amount of an inorganic base and/or an organic base and dissolved therein and thereafter the compound represented by the Chemical structure 4 and other optional components are added and stirred. After the dissolution, the pigment is added and stirred for 12 hours or more. In this process, the compound represented by the Chemical structure 5 is adsorbed to the pigment and the pigment is pre-dispersed. At the same time, the alkoxy siloxane portion of the compound represented by the Chemical structure 4 is hydrolyzed in silanol and thereafter silanols are condensed with each other to form a polysiloxane.

Next, the thus-obtained pre-dispersion is dispersed using a ball mill, a bead mill, a vibration mill, a paint shaker, an ultrasonic disperser, etc. until the particle size is reduced to a desired value.

Next, the thus-obtained dispersion is taken out of the dispersing machine. If necessary, the same inorganic base and/or the same organic base described above are added followed by heating the mixture during stirring. In this process, the carboxylic acid of the compound represented by the Chemical structure 5 reacts with the glycidyl group of the compound represented by the Chemical structure 4 to form a cross-linked structure.

After mixing water, the compound represented by the Chemical structure 4, the compound represented by the Chemical structure 5, and the pigment, the compound represented by the Chemical structure 4 is reacted with the compound represented by the Chemical structure 5 to form a polymer having the structure unit represented by the Chemical structure 1, which ameliorates dispersibility of the pigment.

Specific examples of the inorganic base include, but are not limited to, sodium hydroxide, potassium hydroxide, and lithium hydroxide.

Specific examples of the organic base include, but are not limited to, tetramethyl ammonium, tetraethyl ammonium, tetrapropyl ammonium, tetrabutyl amine, tetrapentyl amine, tetrahexyl amine, triethylmethyl amine, tributylmethyl amine, trioctylmethyl amine, 2-hydroxyethyl trimethyl amine, tris(2-hydroxyethyl)methyl amine, propyltrimethyl amine ion, hexyltrimethyl amine, octyltrimethyl amine, nonyltrimethyl amine, decyltrimethyl amine, dodecyltrimerthyl amine, tetradecyltrimethyl amine, hexadecyl trimethyl amine, octadecyl trimethyl amine, didodecyl dimethyl amine, ditetradecyl dimethyl amine, dihexyadecyl dimethyl amine, dioctadecyl dimethyl amine, ethylhexadecyl dimethyl amine, ammonium, dimethyl amine, trimethyl amine, monoethyl amine, diethyl amine, triethyl amine, monoethanol amine, diethanol amine, triethanol amine, methyl ethanol amine, methyldiethanol amine, dimethylethanol amine, monopropanol amine, dipropanol amine, tripropanol amine, isopropanol amine, morpholinium ion, N-methyl morpholinium, N-methyl-2-pyrolidonium, and 2-pyrolidonium.

Pigment

Examples of the pigments for use in the ink of the present disclosure include, but are not limited to, black pigments, yellow pigments, magenta pigments, cyan pigments, white pigments, green pigments, orange pigments, and gloss pigments and metallic pigments of gold, silver, etc., can be used. These may be used in combination with dyes.

Specific examples of the inorganic pigment include, but are not limited to, titanium oxide, iron oxide, calcium oxide, barium sulfate, aluminum hydroxide, barium yellow, cadmium red, and chrome yellow. Also, carbon black manufactured by known methods such as contact methods, furnace methods, and thermal methods can be used.

Specific examples of the organic pigment include, but are not limited to, azo pigments, polycyclic pigments (for example, phthalocyanine pigments, perylene pigments, perinone pigments, anthraquinone pigments, quinacridone pigments, dioxazine pigments, indigo pigments, thioindigo pigments, isoindolinone pigments, and quinophthalone pigments, etc.), dye chelates (for example, basic dye type chelates, acid dye type chelates, etc.), nitro pigments, nitroso pigments, and aniline black can be used. Of these pigments, pigments having good affinity with water are preferable. Also, resin hollow particles and inorganic hollow particles may be used as the pigment.

Specific examples of the black pigment include, but are not limited to, carbon black (C.I. Pigment Black 7) such as furnace black, lamp black, acetylene black, and channel black, metals such as copper, iron (C.I. Pigment Black 11), and titanium oxide, and organic pigments such as aniline black (C.I. Pigment Black 1).

Specific examples of the pigments for color include, but are not limited to, C.I. Pigment Yellow 1, 3, 12, 13, 14, 17, 24, 34, 35, 37, 42 (yellow iron oxide), 53, 55, 74, 81, 83, 95, 97, 98, 100, 101, 104, 108, 109, 110, 117, 120, 138, 150, 153, 155, 180, 185, and 213; C.I. Pigment Orange 5, 13, 16, 17, 36, 43, and 51; C.I. Pigment Red 1, 2, 3, 5, 17, 22, 23, 31, 38, 48:2, 48:2 {Permanent Red 2B(Ca)}, 48:3, 48:4, 49:1, 52:2, 53:1, 57:1 (Brilliant Carmine 6B), 60:1, 63:1, 63:2, 64:1, 81, 83, 88, 101 (rouge), 104, 105, 106, 108 (Cadmium Red), 112, 114, 122 (Quinacridone Magenta), 123, 146, 149, 166, 168, 170, 172, 177, 178, 179, 184, 185, 190, 193, 202, 207, 208, 209, 213, 219, 224, 254, and 264; C.I. Pigment Violet 1 (Rhodamine Lake), 3, 5:1, 16, 19, 23, and 38; C.I. Pigment Blue 1, 2, 15 (Phthalocyanine Blue), 15:1, 15:2, 15:3, 15:4, (Phthalocyanine Blue), 16, 17:1, 56, 60, and 63; C.I. Pigment Green 1, 4, 7, 8, 10, 17, 18, and 36.

The dye is not particularly limited. Acid dyes, direct dyes, reactive dyes, and basic dyes can be used. These can be used alone or in combination.

Specific examples of the dye include, but are not limited to, C.I. Acid Yellow 17, 23, 42, 44, 79, and 142, C.I. Acid Red 52, 80, 82, 249, 254, and 289, C.I. Acid Blue 9, 45, and 249, C.I. Acid Black 1, 2, 24, and 94, C. I. Food Black 1 and 2, C.I. Direct Yellow 1, 12, 24, 33, 50, 55, 58, 86, 132, 142, 144, and 173, C.I. Direct Red 1, 4, 9, 80, 81, 225, and 227, C.I. Direct Blue 1, 2, 15, 71, 86, 87, 98, 165, 199, and 202, C.I. Direct Black 19, 38, 51, 71, 154, 168, 171, and 195, C.I. Reactive Red 14, 32, 55, 79, and 249, and C.I. Reactive Black 3, 4, and 35.

The proportion of the pigment in the ink is preferably from 0.1 to 15 percent by mass and more preferably from 1 to 10 percent by mass based on the total amount of the ink in terms of enhancement of image density, fixability, and discharging stability.

Pigment Dispersion

The ink can be obtained by mixing a pigment with materials such as water and an organic solvent. It is also possible to mix the pigment with water, a dispersant, etc., to prepare a pigment dispersion and thereafter mix the pigment dispersion with material such as water and an organic solvent to manufacture the ink.

The pigment dispersion is obtained by mixing and dispersing water, a pigment, a pigment dispersant, and other optional components and controlling the particle size. It is good to use a dispersing device for dispersion.

The particle diameter of the pigment in the pigment dispersion has no particular limit. For example, the maximum frequency is preferably from 20 to 500 nm and more preferably from 20 to 150 nm in the maximum number conversion to improve dispersion stability of the pigment and ameliorate discharging stability and the image quality such as image density. The particle diameter of the pigment can be measured using a particle size analyzer (Nanotrac Wave-UT151, manufactured by MicrotracBEL Corp).

In addition, the proportion of the pigment in the pigment dispersion is not particularly limited and can be suitably selected to suit a particular application. In terms of improving discharging stability and increasing image density, the proportion is preferably from 0.1 to 50 percent by mass and more preferably from 0.1 to 30 percent by mass.

It is preferable that the pigment dispersion be filtered with a filter, a centrifuge, etc., to remove coarse particles followed by degassing.

Water

The proportion of water in the ink is not particularly limited and can be suitably selected to suit to a particular application. In terms of drying property and discharging reliability of the ink, the proportion is preferably from 10 to 90 percent by mass and more preferably from 20 to 60 percent by mass.

The ink of the present disclosure may contain a resin for fixing in addition to the polymer having the structure unit represented by the structure unit represented by the Chemical structure 1. Examples of the resin for fixing include, but are not limited to, the following resins.

Resin

The type of the resin contained in the ink has no particular limit and can be suitably selected to suit to a particular application. Examples include, but are not limited to, urethane resins, polyester resins, acrylic-based resins, vinyl acetate-based resins, styrene-based resins, butadiene-based resins, styrene-butadiene-based resins, vinylchloride-based resins, acrylic styrene-based resins, and acrylic silicone-based resins.

Resin particulate made of such resins can be also used. It is possible to mix a resin emulsion in which such resin particles are dispersed in water as a dispersion medium with materials such as a coloring material and an organic solvent to obtain an ink. It is possible to use suitably-synthesized resin particles as the resin particle. Alternatively, the resin particle available on the market can be used. These resin particulate can be used alone or in combination.

The mean volume diameter (volume average particle diameter) of the resin particle is not particularly limited and can be suitably selected to suit to a particular application. The mean volume diameter is preferably from 10 to 1,000 nm, more preferably from 10 to 200 nm, and particularly preferably from 10 to 100 nm to obtain good fixability and image robustness.

The mean volume diameter can be measured by using, for example, a particle size analyzer (Nanotrac Wave-UT151, manufactured by MicrotracBEL Corp.).

The proportion of the resin in the ink is not particularly limited and can be suitably selected to suit to a particular application. In terms of fixability and storage stability of ink, it is preferably from 1 to 30 percent by mass and more preferably from 5 to 20 percent by mass to the total amount of the ink.

The particle diameter of the solid portion in the ink has no particular limit and can be selected to suit to a particular application. The maximum frequency of the particle diameter of the solid portion in the ink is preferably from 20 to 1000 nm and more preferably from 20 to 150 nm in the maximum number conversion to enhance discharging stability and image quality such as image density. The solid portion includes resin particulate, pigment particulate, etc. The particle diameter can be measured by using a particle size analyzer (Nanotrac Wave-UT151, manufactured by MicrotracBEL Corp).

Organic Solvent

There is no specific limitation to the organic solvent for use in the present disclosure. For example, water-soluble organic solvents can be used. Examples include, but are not limited to, polyhydric alcohols, ethers such as polyhydric alcohol alkylethers and polyhydric alcohol arylethers, nitrogen-containing heterocyclic compounds, amides, amines, and sulfur-containing compounds.

Specific examples of the polyhydric alcohol include, but are not limited to, ethylene glycol, diethylene glycol, 1,2-propanediol, 1,3-propane diol, 1,2-butanediol, 1,3-butanediol, 1,4-butanediol, 2,3-butanediol, 3-methyl-1,3-butanediol, trethylene glycol, polyethylene glycol, polypropylene glycol, 1,2-pentanediol, 1,3-pentanediol, 1,4-pentanediol, 2,4-pentanediol, 1,5-pentanediol, 1,2-hexanediol, 1,6-hexanediol, 1,3-hexanediol, 2,5-hexanediol, 1,5-hexanediol, glycerin, 1,2,6-hexanetriol, 2-ethyl-1,3-hexanediol, ethyl-1,2,4-butanetriol, 1,2,3-butanetriol, 2,2,4-trimethyl-1,3-pentanediol, and petriol.

Specific examples of the polyol alkyl ethers include, but are not limited to, ethylene glycol monoethyl ether, ethylene glycol monobutyl ether, diethylene glycol monomethyl ether, diethylene glycol monoethyl ether, diethylene glycol monobutyl ether, tetraethylene glycol monomethyl ether, and propylene glycol monoethyl ether.

Specific examples of the polyol aryl ethers include, but are not limited to, ethylene glycol monophenyl ether and ethylene glycol monobenzyl ether.

Specific examples of nitrogen-containing heterocyclic compounds include, but are not limited to, 2-pyrrolidone, N-methyl-2-pyrrolidone, N-hydroxyethyl-2-pyrrolidone, 1,3-dimethyl-2-imidazoline, ε-caprolactam, and γ-butylolactone.

Specific examples of the amide include, but are not limited to, formamide, N-methylformamide, N,N-dimethylformamide, 3-methoxy-N,N-dimethyl propionamide, and 3-butoxy-N,N-dimethylpropionamide.

Specific examples of the amine include, but are not limited to, monoethanolamine, diethanolamine, and triethyl amine.

Specific examples of the sulfur-containing compounds include, but are not limited to, dimethyl sulphoxide, sulfolane, and thiodiethanol.

Also, propylene carbonate, ethylene carbonate, etc. can be used as the organic solvent.

To serve as a humectant and impart a good drying property, it is preferable to use an organic solvent having a boiling point of 250 degrees C. or lower.

Polyhydric alcohol compounds having eight or more carbon atoms and glycol ether compounds are also suitable as the organic solvent.

Specific examples of the polyol compounds having eight or more carbon atoms include, but are not limited to, 2-ethyl-1,3-hexanediol and 2,2,4-trimethyl-1,3-pentanediol.

Specific examples of the glycolether compounds include, but are not limited to, polyol alkylethers such as ethyleneglycol monoethylether, ethyleneglycol monobutylether, diethyleneglycol monomethylether, diethyleneglycol monoethylether, diethyleneglycol monobutylether, tetraethyleneglycol monomethylether, and propyleneglycol monoethylether; and polyol arylethers such as ethyleneglycol monophenylether and ethyleneglycol monobenzylether.

The polyhydric alcohol compounds having eight or more carbon atoms and glycolether compounds enhance permeability of ink for paper used as a recording medium.

The proportion of the organic solvent in the ink has no particular limit and can be suitably selected to suit to a particular application.

In terms of drying property and discharging reliability of the ink, the proportion is preferably from 10 to 60 percent by mass and more preferably from 20 to 60 percent by mass.

Additive

The ink may further optionally include a surfactant, a defoaming agent, a preservative and fungicide, a corrosion inhibitor, a pH regulator, etc.

Surfactant

Examples of the surfactant include, but are not limited to, silicone-based surfactants, fluorochemical surfactants, amphoteric surfactants, nonionic surfactants, and anionic surfactants.

The silicone-based surfactant has no specific limit and can be suitably selected to suit to a particular application. Of these, silicone-based surfactants not decomposed even in high pH environment are preferable. Examples of the silicone-based surfactant include side-chain modified polydimethylsiloxane, polydimethylsiloxane modified at both ends, polydimethylsiloxane modified at one end, polydimethylsiloxane modified at both ends at the side chain, and the like. As the modification group, it is particularly preferable to select a polyoxyethylene group or polyoxyethylene polyoxypropylene group because these demonstrate good properties as aqueous surfactants. It is possible to use a polyether-modified silicone-based surfactant as the silicone-based surfactant. A specific example thereof is a compound in which a polyalkylene oxide structure is introduced into the side chain of the Si site of dimethyl siloxane.

Specific examples of the fluorochemical surfactant include, but are not limited to, perfluoroalkyl sulfonic acid compounds, perfluoroalkyl carboxylic acid compounds, ester compounds of perfluoroalkyl phosphoric acid, adducts of perfluoroalkyl ethylene oxide, and polyoxyalkylene ether polymer compounds having a perfluoroalkyl ether group in its side chain. These are particularly preferable because the fluorochemical surfactant does not easily produce foams.

Specific examples of the perfluoroalkyl sulfonic acid compounds include, but are not limited to, perfluoroalkyl sulfonic acid and salts of perfluoroalkyl sulfonic acid.

Specific examples of the perfluoroalkyl carbonic acid compounds include, but are not limited to, perfluoroalkyl carbonic acid and salts of perfluoroalkyl carbonic acid.

Specific examples of the polyoxyalkylene ether polymer compounds having a perfluoroalkyl ether group in its side chain include, but are not limited to, sulfuric acid ester salts of polyoxyalkylene ether polymer having a perfluoroalkyl ether group in its side chain, and salts of polyoxyalkylene ether polymers having a perfluoroalkyl ether group in its side chain. Counter ions of salts in these fluorochemical surfactants are, for example, Li, Na, K, $NH_4$, $NH_3CH_2CH_2OH$, $NH_2(CH_2CH_2OH)_2$, and $NH(CH_2CH_2OH)_3$.

Specific examples of the ampholytic surfactants include, but are not limited to, lauryl aminopropionic acid salts, lauryl dimethyl betaine, stearyl dimethyl betaine, and lauryl dihydroxyethyl betaine.

Specific examples of the nonionic surfactants include, but are not limited to, polyoxyethylene alkyl phenyl ethers, polyoxyethylene alkyl esters, polyoxyethylene alkyl amines, polyoxyethylene alkyl amides, polyoxyethylene propylene block polymers, sorbitan aliphatic acid esters, polyoxyethylene sorbitan aliphatic acid esters, and adducts of acetylene alcohol with ethylene oxides.

Specific examples of the anionic surfactants include, but are not limited to, polyoxyethylene alkyl ether acetates, dodecyl benzene sulfonates, laurates, and polyoxyethylene alkyl ether sulfates.

These can be used alone or in combination.

The silicone-based surfactant is not particularly limited and can be suitably selected to suit to a particular application. Examples include, but are not limited to, side-chain modified polydimethylsiloxane, both-terminal modified polydimethylsiloxane, one terminal-modified polydimethyl siloxane, and side chain both terminal modified polydimethylsiloxane. Of these, polyether-modified silicon-based surfactants having a polyoxyethylene group or polyoxyethylene polyoxypropylene group as the modification group are particularly preferable because these demonstrate good properties as aqueous surfactants.

Specific examples of the polyether-modified silicone-based surfactants include, but are not limited to, KF-618, KF-642, and KF-643 (all manufactured by Shin-Etsu Chemical Co., Ltd.), EMALEX-SS-5602 and SS-1906EX (both manufactured by NIHON EMULSION Co., Ltd.), FZ-2105, FZ-2118, FZ-2154, FZ-2161, FZ-2162, FZ-2163, and FZ-2164 (all manufactured by Dow Corning Toray Co., Ltd.), BYK-33 and BYK-387 (both manufactured by BYK-Chemie GmbH), and TSF4440, TSF4452, and TSF4453 (all manufactured by Momentive Performance Materials Inc.).

The fluorochemical surfactant is preferably a compound having 2 to 16 fluorine-substituted carbon atoms and more preferably a compound having 4 to 16 fluorine-substituted carbon atoms.

Specific examples of the fluorochemical surfactant include, but are not limited to, perfluoroalkyl phosphoric acid ester compounds, adducts of perfluoroalkyl with ethylene oxide, and polyoxyalkylene ether polymer compounds having a perfluoroalkyl ether group in its side chain. Of these, polyoxyalkylene ether polymer compounds having a perfluoroalkyl ether group in its side chain are particularly preferable because of its low foaming property.

As the fluorochemical surfactant, products available on the market may be used.

Specific examples of the products available on the market include, but are not limited to, SURFLON S-111, S-112, S-113, S-121, S-131, S-132, S-141, and S-145 (all manufactured by ASAHI GLASS CO., LTD.); FLUORAD FC-93, FC-95, FC-98, FC-129, FC-135, FC-170C, FC-430, and FC-431 (all manufactured by SUMITOMO 3M); MEGAFACE F-470, F-1405, and F-474 (all manufactured by DIC CORPORATION); ZONYL TBS, FSP, FSA, FSN-100, FSN, FSO-100, FSO, FS-300, and UR (all manufactured by E. I. du Pont de Nemours and Company); FT-110, FT250, FT-251, FT-400S, FT-150, and FT-400SW (all manufactured by NEOS COMPANY LIMITED); POLYFOX PF-136A, PF-156A, PF-151N, PF-154, and PF-159 (manufactured by OMNOVA SOLUTIONS INC.), and UNIDYNE DSN-403N (manufactured by DAIKIN INDUSTRIES). Of these, FS-300 (manufactured by E. I. du Pont de Nemours and Company), FT-110, FT-250, FT-251, FT-400S, FT-150, and FT-400SW (manufactured by NEOS COMPANY LIMITED), PolyFox PF-151N (manufactured by OMNOVA SOLUTIONS INC.), and UNIDYNE DSN-403N (manufactured by DAIKIN INDUSTRIES) are particularly preferable in terms of good printing quality, coloring in particular, and improvement on permeation to paper, wettability, and uniform dying property.

The proportion of the surfactant in the ink is not particularly limited and can be suitably selected to suit to a particular application. For example, the proportion is preferably from 0.001 to 5 percent by mass and more preferably from 0.05 to 5 percent by mass in terms of excellent wettability and discharging stability and improvement on image quality.

Defoaming Agent

The defoaming agent has no particular limit. For example, silicon-based defoaming agents, polyether-based defoaming agents, and aliphatic acid ester-based defoaming agents are suitable. These can be used alone or in combination. Of these, silicone-based defoaming agents are preferable in terms of the effect of foam breaking.

Preservatives and Fungicides

The preservatives and fungicides are not particularly limited. A specific example is 1,2-benzisothiazoline-3-one.

Corrosion Inhibitor

The corrosion inhibitor has no particular limitation. Specific examples include, but are not limited to, acid sulfites and sodium thiosulfates.

pH Regulator

The pH regulator has no particular limit as long as it can control pH to be not lower than 7. Specific examples include, but are not limited to, amines such as diethanol amine and triethanol amine.

Properties of the ink are not particularly limited and can be suitably selected to suit to a particular application. For example, viscosity, surface tension, and pH are preferably in the following ranges.

Viscosity of the ink at 25 degrees C. is preferably from 5 to 30 mPa·s and more preferably from 5 to 25 mPa·s to improve print density and text quality and obtain good dischargeability. Viscosity can be measured by, for example, a rotatory viscometer (RE-80L, manufactured by TOKI SANGYO CO., LTD.). The measuring conditions are as follows:

Standard cone rotor (1°34'×R24)
Sample liquid amount: 1.2 mL
Rotational frequency: 50 rotations per minute (rpm)
25 degrees C.
Measuring time: three minutes.

The surface tension of the ink is preferably 35 mN/m or less and more preferably 32 mN/m or less at 25 degrees C. in terms that the ink is suitably leveled on a recording medium and the drying time of the ink is shortened.

pH of the ink is preferably from 7 to 12 and more preferably from 8 to 11 in terms of prevention of corrosion of metal material in contact with liquid.

Recording Medium

The recording medium for use in recording is not particularly limited. Specific examples include, but are not limited to, plain paper, gloss paper, special paper, cloth, film, transparent sheets, and printing paper for general purposes.

The recording media are not limited to articles used as typical recording media. It is suitable to use building materials such as wall paper, floor material, and tiles, cloth for apparel such as T-shirts, textile, and leather as the recording medium. In addition, the configuration of the paths through which the recording medium is conveyed can be adjusted to use ceramics, glass, metal, etc.

Recorded Matter

The ink recorded matter of the present disclosure includes a recording medium and an image formed on the recording medium with the ink of the present disclosure.

The recorded matter is obtained by an inkjet recording device executing an inkjet recording method.

Recording Device and Recording Method

The ink of the present disclosure can be suitably applied to various recording devices employing an inkjet recording method, such as printers, facsimile machines, photocopiers, multifunction peripherals (serving as a printer, a facsimile machine, and a photocopier), and solid freeform fabrication devices (3D printers, additive manufacturing devices).

In the present disclosure, the recording device and the recording method respectively represent a device capable of discharging ink, various processing liquids, etc., to a recording medium and a method of recording utilizing the device. The recording medium means an article to which ink or various processing fluids can be temporarily or permanently attached.

The recording device may further optionally include a device relating to feeding, conveying, and ejecting a recording medium and other devices referred to as a pre-processing device, a post-processing device, etc., in addition to the head portion to discharge the ink.

The recording device and the recording method may further optionally include a heating device (heater) for use in the heating process and a drying device (drier) for use in the drying process. For example, the heating device and the drying device heat and dry the print surface and the opposite surface of a recording medium. The heating device and the drying device are not particularly limited. For example, a fan heater and an infra-red heater can be used. Heating and drying can be conducted before, in the middle of, or after printing.

In addition, the recording device and the recording method are not limited to those producing meaningful visible images such as texts and figures with ink. For example, the recording method and the recording device capable of producing patterns like geometric design and 3D images are included.

In addition, the recording device includes both a serial type device in which the discharging head is allowed to move and a line type device in which the liquid discharging head is not moved, unless otherwise specified.

Furthermore, in addition to the desktop type, this recording device includes a device capable of printing images on a wide recording medium such as A0 and a continuous printer capable of using continuous paper rolled up in a roll form as a recording medium.

Figure 2:
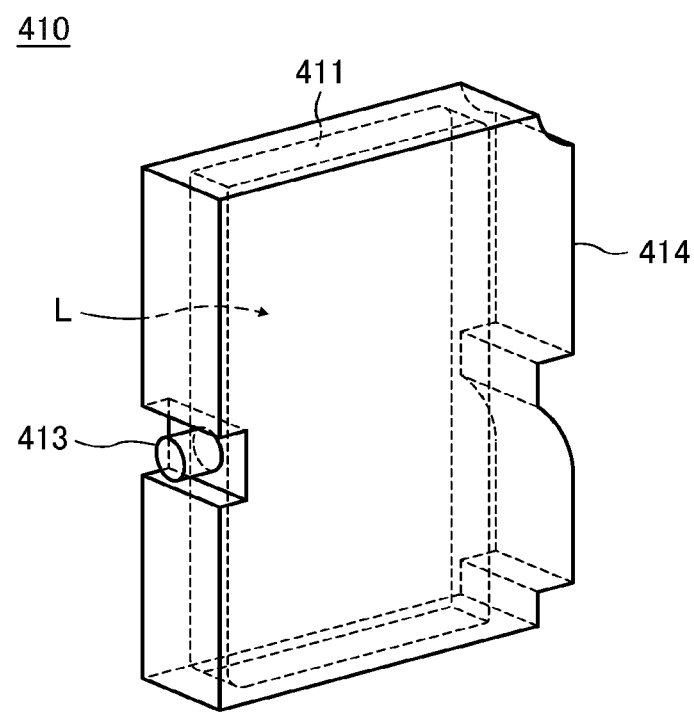
FIG. 2 is a diagram illustrating a perspective view of a tank of the recording device illustrated in FIG. 1.

The recording device is described using an example with reference to FIG. 1 and FIG. 2. FIG. 1 is a diagram illustrating a perspective view of the recording device. FIG. 2 is a diagram illustrating a perspective view of the main tank. An image forming device 400 as an embodiment of the recording device is a serial type image forming device. A mechanical unit 420 is disposed in an exterior 401 of the image forming apparatus 400. Each ink accommodating unit (ink container) 411 of each main tank 410 (410*k*, 410*c*, 410*m*, and 410*y*) containing liquid L (each color of black (K), cyan (C), magenta (M), and yellow (Y) is made of, for example, packaging material such as aluminum laminate film. The ink accommodating unit 411 is housed in, for example, a plastic container housing unit 414. As a result, the main tank 410 is used as an ink cartridge of each color.

A cartridge holder 404 is disposed on the rear side of the opening appearing when a cover 401*c* is opened. The main tank 410 is detachably attached to the cartridge holder 404. This enables each ink outlet 413 of the main tank 410 to communicate with a discharging head 434 for each color via a supplying tube 436 for each color so as to discharge the ink from the discharging head 434 to a recording medium.

The main tank (ink accommodating container) 410 accommodates the ink and includes other optional suitably-selected members. There is no specific limit to the container. The form, the structure, the size, and the material thereof can be suitably determined to suit to a particular application. For example, a container including at least an ink bag formed of aluminum laminate film, a resin film, etc. is suitable.

The ink accommodating unit 411 is filled with ink supplied through an ink inlet. Subsequent to degassing, the ink inlet is closed by fusion to form the main tank 410. When in use, an ink outlet 413 made of a rubber member is pierced with the needle installed onto an inkjet recording device to supply the ink into the device. The ink accommodating unit 411 is made of a packaging material such as aluminum laminate film having no air permeability. The ink container 411 is typically housed in a plastic container housing unit 414 made of plastic and detachably attachable to various inkjet recording devices.

This recording device may include not only a portion to discharge ink but also a device referred to as a pre-processing device, a post-processing device, etc.

As an example of the pre-processing device and the post-processing device, like the ink of black (K), cyan (C), magenta (M), and yellow (Y) ink, the pre-processing device and the post-processing device may further include a liquid accommodating unit including a pre-processing liquid or a post-processing liquid and a liquid discharging head to discharge the pre-processing liquid or the post-processing liquid according to an inkjet printing method.

As another example of the pre-processing device and the post-processing device, it is suitable to dispose a pre-processing device and a post-processing device not employing the inkjet printing method but a blade coating method, a roll coating method, or a spray coating method.

Pre-Processing Fluid

The pre-processing fluid includes a flocculant, an organic solvent, water, and optional materials such as a surfactant, a defoaming agent, a pH regulator, a preservatives and fungicides, and a corrosion inhibitor.

The organic solvent, the surfactant, the defoaming agent, the pH regulator, the preservatives and fungicides, and the corrosion inhibitor can be the same material as those for use in the ink. Also, other material for use in known processing fluid can be used.

The type of the flocculant is not particularly limited. For example, water-soluble cationic polymers, acids, and multi-valent metal salts are suitable.

Post-Processing Fluid

The post-processing fluid has no particular limit. It is preferable that the post-processing fluid can form a transparent layer. Material such as organic solvents, water, resins, surfactants, defoaming agents, pH regulators, preservatives and fungicides, corrosion inhibitors, etc. is suitably selected based on a necessity basis and mixed to obtain the post-processing fluid. The post-processing fluid can be applied to the entire recording area formed on a recording medium or only the area on which an ink image is formed.

How to use the ink is not limited to the inkjet recording method.

Specific examples of such methods other than the inkjet recording method include, but are not limited to, blade coating methods, gravure coating methods, bar coating methods, roll coating methods, dip coating methods, curtain coating methods, slide coating methods, die coating methods, and spray coating methods.

The usage of the ink of the present disclosure is not particularly limited and can be suitably selected to suit to a particular application. For example, the ink can be used for printed matter, a paint, a coating material, and foundation. The ink can be used to form two-dimensional texts and images and furthermore a three-dimensional solid object (solid freeform fabrication object) as a material for 3D modeling.

The solid fabrication apparatus to fabricate a solid fabrication object can be any known device with no particular limit. For example, the apparatus includes a container, a supplying device, and a discharging device, a drier, etc., of ink. The solid fabrication object includes an object manufactured by repeated ink coating. In addition, the solid fabrication object includes a mold-processed product manufactured by processing a structure having a substrate such as a recording medium to which the ink is applied. The mold-processed product is manufactured from recorded matter or a structure having a sheet-like form, film-like form, etc., by, for example, heating drawing or punching. The mold-processed product is suitably used for articles which are molded after surface-decorating. Examples are gauges or operation panels of vehicles, office machines, electric and electronic devices, cameras, etc.

Image forming, recording, printing, print, etc. in the present disclosure represent the same meaning.

Also, recording media, media, substrates in the present disclosure have the same meaning.

Having generally described preferred embodiments of this disclosure, further understanding can be obtained by reference to certain specific examples which are provided herein for the purpose of illustration only and are not intended to be limiting. In the descriptions in the following examples, the numbers represent weight ratios in parts, unless otherwise specified.

EXAMPLES

Next, embodiments of the present disclosure are described in detail with reference to Examples but are not limited thereto.

The number average molecular weight and the weight average molecular weight of the copolymers of the following Examples and Comparative Examples were measured as follows.

Measurement of Number Average Molecular Weight and Weight Average Molecular Weight of Copolymer The average molecular weight of the copolymer was measured by gel permeation chromatography (GPC) under the following conditions:
Instrument: GPC-8320 GPC (manufactured by TOSOH CORPORATION)
Column: TSK G2000 HXL and G4000 HXL (manufactured by TOSOH CORPORATION)
Temperature: 40 degrees C.
Tetrahydrofuran
Flow rate: 0.6 mL/min.

1 mL of a copolymer having a concentration of 0.5 percent by mass was infused into the column and using the molecular weight calibration curve obtained based on a simple dispersion polystyrene standard sample from the molecular weight distribution of the copolymer measured under the conditions specified above, the number average molecular weight Mn and the weight average molecular weight Mw of the copolymer were calculated.

Synthesis Example

Synthesis of Polymer Precursor PP-1

2.50 g (28.8 mmol) of methacrylic acid (manufactured by Tokyo Chemical Industry Co., Ltd.), 5.23 g (50.2 mmol) of styrene (manufactured by Tokyo Chemical Industry Co., Ltd.), 2.18 g of styrene macromer (AS-6S, manufactured by TOAGOSEI CO., LTD.), and 2.18 g of polypropylene glycol monomethacrylate (BLEMMER® PP-800, manufactured by NOF Corporation) were dissolved in 36 mL of methyl ethyl ketone to prepare a monomer solution. The monomer solution was divided into two with a mass ratio of 10 percent to 90 percent. After heating 10 percent by mass of the prepared monomer solution to 75 degreed C in an argon atmosphere, a solution in which 0.128 g (0.78 mmol) of 2,2'-azoiso (butyronitrile) (manufactured by Tokyo Chemical Industry Co. Ltd.) and 0.021 g (0.20 mmol) of 3-mercaptopropionic acid were dissolved in the remaining monomer solution was dripped to the heated solution in two hours followed by stirring at 75 degrees C. for four hours. The resulting solution was cooled down to room temperature (25 degrees C.) and the thus-obtained reaction solution was dripped to hexane to precipitate. The precipitate was filtered followed by drying with a reduced pressure to obtain 11.10 g of a polymer precursor PP-1 (number average molecular weight (Mn): 11,600, weight average molecular weight (Mw): 21,200).

Thereafter, 2.00 g of the obtained polymer precursor PP-1 was dissolved in an aqueous solution of tetraethyl ammonium hydroxide aqueous solution in such a manner that the concentration of the polymer precursor PP-1 was 3.81 percent by mass and the pH thereof was 8.0 to prepare an aqueous solution for pigment dispersion of the polymer precursor PP-1.

Synthesis of Polymer Precursor PP-2

6.22 g (72.2 mmol) of methacrylic acid (manufactured by Tokyo Chemical Industry Co., Ltd.), 1.41 g (13.5 mmol) of styrene (manufactured by Tokyo Chemical Industry Co., Ltd.), 2.18 g of styrene macromer (AS-6S, manufactured by TOAGOSEI CO., LTD.), and 2.18 g of polypropylene glycol monomethacrylate (BLEMMER® PP-800, manufactured by NOF Corporation) were dissolved in 36 mL of methyl ethyl ketone to prepare a monomer solution. The monomer solution was divided into two with a mass ratio of 10 percent to 90 percent. After heating 10 percent by mass of the prepared monomer solution to 75 degreed C in an argon atmosphere, a solution in which 0.128 g (0.78 mmol) of 2,2'-azoiso (butyronitrile) (manufactured by Tokyo Chemical Industry Co. Ltd.) and 0.021 g (0.20 mmol) of 3-mercaptopropionic acid were dissolved in the remaining monomer solution was dripped to the heated solution in two hours followed by stirring at 75 degrees C. for four hours. The resulting solution was cooled down to room temperature (25 degrees C.) and the thus-obtained reaction solution was dripped to hexane. The precipitate was filtered followed by drying with a reduced pressure to obtain 11.20 g of a polymer precursor PP-2 (number average molecular weight (Mn): 11,200, weight average molecular weight (Mw): 21,000).

Thereafter, 2.00 g of the obtained polymer precursor PP-2 was dissolved in an aqueous solution of tetraethyl ammonium hydroxide aqueous solution in such a manner that the concentration of the polymer precursor PP-2 was 3.81 percent by mass and the pH thereof was 8.0 to prepare an aqueous solution for pigment dispersion of the polymer precursor PP-2.

The polymer precursors PP-1 and PP-2 were represented by the Chemical structure 5 and $R_1$ in the Chemical structure 5 has a structure represented by the following Chemical structure 6.

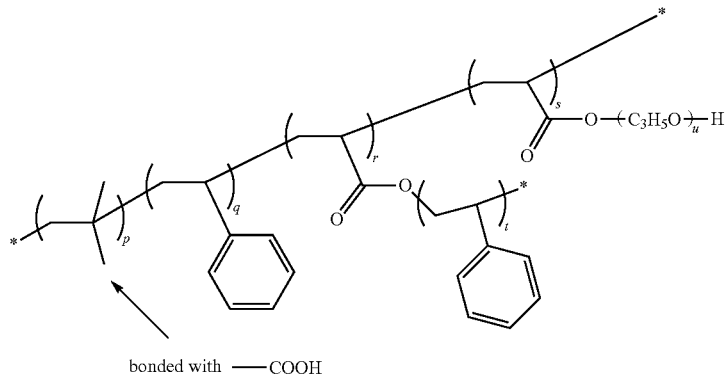

Chemical structure 6 bonded with ——COOH

Synthesis of Polymer Precursor PP-3

2.34 g (27.1 mmol) of methacrylic acid (manufactured by Tokyo Chemical Industry Co., Ltd.), 9.06 g (87.0 mmol) of styrene (manufactured by Tokyo Chemical Industry Co., Ltd.), and 0.60 g (5.1 mmol) of α-methylstyrene (manufactured by Tokyo Chemical Industry Co., Ltd.) were dissolved in 36 mL of methyl ethyl ketone to prepare a monomer solution. The monomer solution was divided into two with a mass ratio of 10 percent to 90 percent. After heating 10 percent by mass of the prepared monomer solution to 75 degrees C. in an argon atmosphere, a solution in which 0.128 g (0.78 mmol) of 2,2'-azoiso (butyronitrile) (manufactured by Tokyo Chemical Industry Co. Ltd.) and 0.021 g (0.20 mmol) of 3-mercaptopropionic acid were dissolved in the remaining monomer solution was dripped to the heated solution in two hours followed by stirring at 75 degrees C. for four hours. The resulting solution was cooled down to room temperature (25 degrees C.) and the thus-obtained reaction solution was dripped to hexane. The precipitate was filtered followed by drying with a reduced pressure to obtain 11.38 g of a polymer precursor PP-3 (number average molecular weight (Mn): 11,900, weight average molecular weight (Mw): 21,500).

Thereafter, 2.00 g of the obtained polymer precursor PP-3 was dissolved in an aqueous solution of tetraethyl ammonium hydroxide aqueous solution in such a manner that the concentration of the polymer precursor PP-3 was 3.81 percent by mass and the pH thereof was 8.0 to prepare an aqueous solution for pigment dispersion of the polymer precursor PP-3.

Synthesis of Polymer Precursor PP-4

5.70 g (66.2 mmol) of methacrylic acid (manufactured by Tokyo Chemical Industry Co., Ltd.), 5.76 g (55.3 mmol) of styrene (manufactured by Tokyo Chemical Industry Co., Ltd.), and 0.54 g (4.6 mmol) of α-methylstyrene (manufactured by Tokyo Chemical Industry Co., Ltd.) were dissolved in 36 mL of methyl ethyl ketone to prepare a monomer solution. The monomer solution was divided into two with a mass ratio of 10 percent to 90 percent. After heating 10 percent by mass of the prepared monomer solution to 75 degrees C. in an argon atmosphere, a solution in which 0.128 g (0.78 mmol) of 2,2'-azoiso (butyronitrile) (manufactured by Tokyo Chemical Industry Co. Ltd.) and 0.021 g (0.20 mmol) of 3-mercaptopropionic acid were dissolved in the remaining monomer solution was dripped to the heated solution in two hours followed by stirring at 75 degrees C. for four hours. The resulting solution was cooled down to room temperature (25 degrees C.) and the thus-obtained reaction solution was dripped to hexane. The precipitate was filtered followed by drying with a reduced pressure to obtain 11.41 g of a polymer precursor PP-4 (number average molecular weight (Mn): 10,100, weight average molecular weight (Mw): 20,200).

Thereafter, 2.00 g of the obtained polymer precursor PP-4 was dissolved in an aqueous solution of tetraethyl ammonium hydroxide aqueous solution in such a manner that the concentration of the polymer precursor PP-4 was 3.81 percent by mass and the pH thereof was 8.0 to prepare an aqueous solution for pigment dispersion of the polymer precursor PP-4.

The polymer precursors PP-3 and PP-4 were represented by the Chemical structure 5 and $R_1$ in the Chemical structure 5 has a structure represented by the following Chemical structure 7.

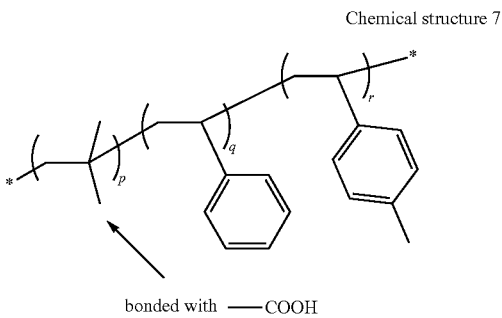

Chemical structure 7 bonded with ——COOH

Synthesis of Polymer Precursor PP-5

4.20 g (48.8 mmol) of methacrylic acid (manufactured by Tokyo Chemical Industry Co., Ltd.), 4.80 g (46.1 mmol) of styrene (manufactured by Tokyo Chemical Industry Co., Ltd.), and 3.00 g (17.0 mmol) of benzyl methacrylate (manufactured by Tokyo Chemical Industry Co., Ltd.) were dissolved in 36 mL of methyl ethyl ketone to prepare a monomer solution. The monomer solution was divided into two with a mass ratio of 10 percent to 90 percent. After heating 10 percent by mass of the prepared monomer solution to 75 degrees C. in an argon atmosphere, a solution in which 0.128 g (0.78 mmol) of 2,2'-azoiso (butyronitrile)

(manufactured by Tokyo Chemical Industry Co. Ltd.) and 0.021 g (0.20 mmol) of 3-mercaptopropionic acid were dissolved in the remaining monomer solution was dripped to the heated solution in two hours followed by stirring at 75 degrees C. for four hours. The resultant was cooled down to room temperature (25 degrees C.) and the thus-obtained reaction solution was dripped to hexane. The precipitate was filtered followed by drying with a reduced pressure to obtain 11.33 g of a polymer precursor PP-5 (number average molecular weight (Mn): 9,900, weight average molecular weight (Mw): 20,000).

Thereafter, 2.00 g of the obtained polymer precursor PP-5 was dissolved in an aqueous solution of tetraethyl ammonium hydroxide aqueous solution in such a manner that the concentration of the polymer precursor PP-5 was 3.81 percent by mass and the pH thereof was 8.0 to prepare an aqueous solution for pigment dispersion of the polymer precursor PP-5.

The polymer precursor PP-5 was represented by the Chemical structure 5 and $R_1$ in the Chemical structure 5 has a structure represented by the following Chemical structure 8.

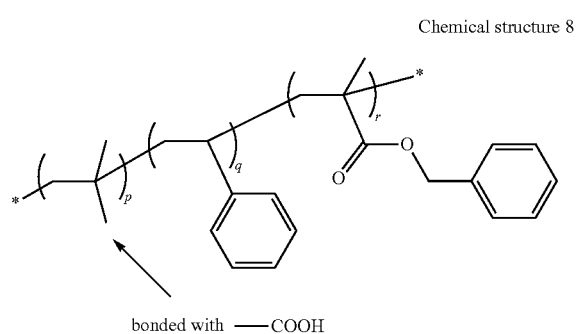

Chemical structure 8 bonded with ——COOH

Synthesis of Polymer Precursor PP-6

62.0 g (525 mmol) of 1,6-hexanediol (manufactured by Tokyo Chemical Industry Co. Ltd.) was dissolved in 200 mL of methylene chloride (dichloromethane) and thereafter 20.7 g (262 mmol) of pyridine was further added. To this solution, a solution in which 50.0 g (262 mmol) of 2-naphthalene carbonyl chloride (manufacture by Tokyo Chemical Industry Co. Ltd.) was dissolved in 100 ml of methylene chloride was dripped in 30 minutes during stirring followed by stirring at room temperature (25 degrees C.) for six hours. The thus-obtained reaction solution was rinsed with water and thereafter the organic phase was isolated followed by drying with magnesium sulfate and the solvent was distilled away. The residual was refined by silica gel column chromatography with a solvent mixture of a methylene chloride and methanol with a volume ratio of 98:2 serving as an eluent to obtain 52.5 g of 2-naphthoic acid-6-hydroxyhexyl ester.

Next, 40.9 g (150 mmol) of 2-naphthoic acid-6-hydroxyhexyl ester was dissolved in 100 mL of dried methylene chloride followed by heating to 40 degrees C.

To this solution, a solution in which 0.029 g (0.045 mmol) of dibutyltin dilaurate was dissolved in 29.9 g (150 mmol) of 2-(2-isocyanatoethoxy)ethyl methacrylate (KARENZ™ MOI-EG, manufactured by Showa Denko K.K.) was dripped during stirring in one hour followed by stirring at 40 degrees C. for 12 hours. Moreover, subsequent to cooling down to room temperature (25 degrees C.), the solvent was distilled away. The residue was refined by silica gel column chromatography with a solvent mixture of a dichloromethane and methanol with a volume ratio of 99:1 serving as an eluent to obtain 48.7 g of a monomer M-1 represented by the following Chemical structure 4-1.

Monomer M-1

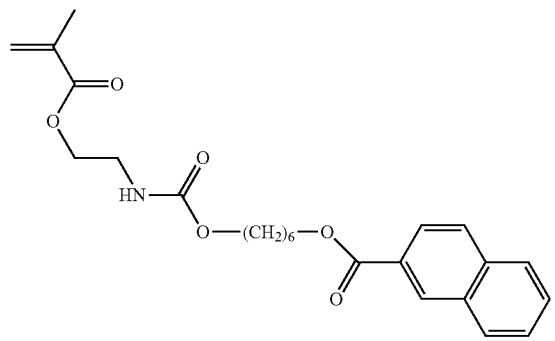

Chemical structure 4-1

Next, 1.50 g (20.8 mmol) of acrylic acid (manufactured by Tokyo Chemical Industry Co. Ltd.) and 7.01 g (14.9 mmol) of monomer M-1 were dissolved in 40 mL of methyl ethyl ketone to prepare a monomer solution. The monomer solution was divided into two with a mass ratio of 10 percent to 90 percent. After heating 10 percent by mass of the prepared monomer solution to 75 degrees C. in an argon atmosphere, a solution in which 0.085 g (0.52 mmol) of 2,2'-azoiso (butyronitrile) (manufactured by Tokyo Chemical Industry Co. Ltd.) and 0.018 g (0.17 mmol) of 3-mercaptopropionic acid were dissolved in the remaining monomer solution was dripped to the heated solution followed by stirring at 75 degrees C. for four hours. The resulting solution was cooled down to room temperature (25 degrees C.) and the thus-obtained reaction solution was dripped to hexane. The precipitate was filtered followed by drying with a reduced pressure to obtain 8.33 g of a polymer precursor PP-6 (number average molecular weight (Mn): 10,200, weight average molecular weight (Mw): 20,500).

Thereafter, 2.00 g of the obtained polymer precursor PP-6 was dissolved in an aqueous solution of tetraethyl ammonium hydroxide aqueous solution in such a manner that the concentration of the polymer precursor PP-6 was 3.81 percent by mass and the pH thereof was 8.0 to prepare an aqueous solution for pigment dispersion of the polymer precursor PP-6.

Synthesis of Polymer Precursor PP-7

48.8 g (787 mmol) of ethylene glycol (manufactured by TOKYO CHEMICAL INDUSTRY CO., LTD.) was dissolved in 200 mL of methylene chloride (dichloromethane) and thereafter 21.8 g (275 mmol) of pyridine was further added. To this solution, a solution in which 50.0 g (262 mmol) of 2-naphthalene carbonyl chloride (manufacture by Tokyo Chemical Industry Co. Ltd.) was dissolved in 100 ml of methylene chloride was dripped in 30 minutes during stirring followed by stirring at room temperature for six hours. The thus-obtained reaction solution was rinsed with water and thereafter the organic phase was isolated followed by drying with magnesium sulfate and the solvent was distilled away. The remainder was refined by silica gel column chromatography with a solvent mixture of a methylene chloride and methanol with a volume ratio of 99:1 serving as an eluent to obtain 72.6 g of 2-naphthoic acid-2-hydroxyethyl ester.

Next, 32.5 g (150 mmol) of 2-naphthoic acid-2-hydroxyhexyl ester was dissolved in 60 mL of dried methylene chloride followed by heating to 40 degrees C.

To this solution, a solution in which 0.029 g (0.045 mmol) of dibutyltin dilaurate was dissolved in 29.9 g (150 mmol) of 2-(2-isocyanatoethoxy)ethyl methacrylate (KARENZ™ MOI-EG, manufactured by Showa Denko K.K.) was dripped during stirring in one hour followed by stirring at 40 degrees C. for 12 hours. Moreover, subsequent to cooling down to room temperature (25 degrees C.), the solvent was distilled away. The residue was refined by silica gel column chromatography with a solvent mixture of a dichloromethane and methanol with a volume ratio of 99:1 serving as an eluent to obtain 39.4 g of a monomer M-2 represented by the following Chemical structure 4-2.

Monomer M-2

Chemical structure 4-2

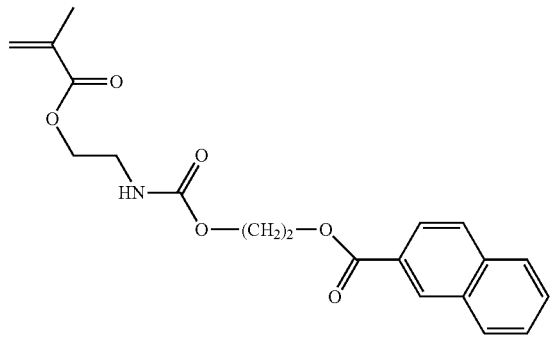

Next, 1.58 g (21.9 mmol) of acrylic acid (manufactured by Tokyo Chemical Industry Co. Ltd.) and 6.51 g (15.7 mmol) of the monomer M-2 were dissolved in 40 mL of methyl ethyl ketone to prepare a monomer solution. The monomer solution was divided into two with a mass ratio of 10 percent to 90 percent. After heating 10 percent by mass of the prepared monomer solution to 75 degrees C. in an argon atmosphere, a solution in which 0.090 g (0.55 mmol) of 2,2'-azoiso (butyronitrile) (manufactured by Tokyo Chemical Industry Co. Ltd.) and 0.019 g (0.18 mmol) of 3-mercaptopropionic acid were dissolved in the remaining monomer solution was dripped to the heated solution followed by stirring at 75 degrees C. for four hours. The resultant was cooled down to room temperature (25 degrees C.) and the thus-obtained reaction solution was dripped to hexane. The precipitate was filtered followed by drying with a reduced pressure to obtain 7.97 g of a polymer precursor PP-7 (number average molecular weight (Mn): 9,400, weight average molecular weight (Mw): 19,200).

Thereafter, 2.00 g of the obtained polymer precursor PP-7 was dissolved in an aqueous solution of tetraethyl ammonium hydroxide aqueous solution in such a manner that the concentration of the polymer precursor PP-7 was 3.81 percent by mass and the pH thereof was 8.0 to prepare an aqueous solution for pigment dispersion of the polymer precursor PP-7.

Synthesis of Polymer Precursor PP-8

103 g (511 mmol) of 1,12-dodecanediol (manufactured by Tokyo Chemical Industry Co. Ltd.) was dissolved in 300 mL of tetrahydrofuran and thereafter 14.2 g (179 mmol) of pyridine was further added. To this solution, a solution in which 32.5 g (170 mmol) of 2-naphthalene carbonyl chloride (manufacture by Tokyo Chemical Industry Co. Ltd.) was dissolved in 100 ml of tetrahydrofuran was dripped in 30 minutes during stirring followed by stirring at room temperature (25 degrees C.) for six hours. The thus-obtained reaction solution was condensed and methanol was added to the obtained white residue. Thereafter, the liquid mixture was stirred for 30 minutes and filtered. After the obtained white solid was rinsed with water and methanol in this order, the resulting matter was dried with a reduced pressure and refined by silica gel column chromatography with a solvent mixture of a methylene chloride and methanol with a volume ratio of 98:2 serving as an eluent to obtain 41.5 g of 2-naphthoic acid-12-hydroxyethyl ester.

Next, 39.0 g (109 mmol) of 2-naphthoic acid-12-hydroxy dodecyl ester was dissolved in 200 mL of dried methylene chloride followed by heating to 40 degrees C.

To this solution, a solution in which 0.021 g (0.033 mmol) of dibutyltin dilaurate was dissolved in 21.8 g (109 mmol) of 2-(2-isocyanatoethoxy)ethyl methacrylate (KARENZ™ MOI-EG, manufactured by Showa Denko K.K.) was dripped during stirring in one hour followed by stirring at 40 degrees C. for 12 hours. Moreover, subsequent to cooling down to room temperature (25 degrees C.), the solvent was distilled away. The residue was refined by silica gel column chromatography with a solvent mixture of a dichloromethane and methanol with a volume ratio of 99:1 serving as an eluent to obtain 38.8 g of a monomer M-3 represented by the following Chemical structure 4-3.

Monomer M-3

Chemical structure 4-3

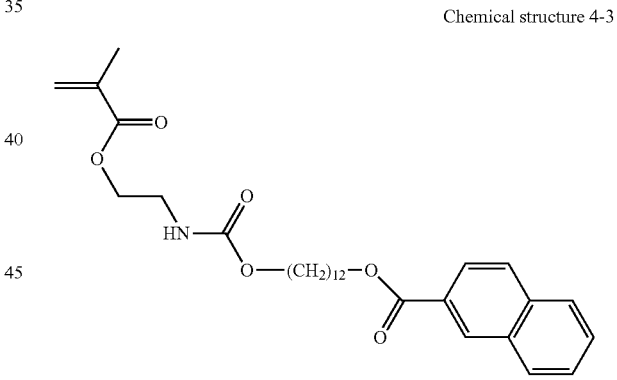

Next, 1.24 g (17.2 mmol) of acrylic acid (manufactured by Tokyo Chemical Industry Co. Ltd.) and 6.83 g (12.3 mmol) of the monomer M-3 were dissolved in 40 mL of methyl ethyl ketone to prepare a monomer solution. The monomer solution was divided into two with a mass ratio of 10 percent to 90 percent. After heating 10 percent by mass of the prepared monomer solution to 75 degrees C. in an argon atmosphere, a solution in which 0.071 g (0.43 mmol) of 2,2'-azoiso(butyronitrile) (manufactured by Tokyo Chemical Industry Co. Ltd.) and 0.015 g (0.14 mmol) of 3-mercaptopropionic acid were dissolved in the remaining monomer solution was dripped to the heated solution in two hours followed by stirring at 75 degrees C. for four hours. The resultant was cooled down to room temperature (25 degrees C.) and the thus-obtained reaction solution was dripped to hexane. The precipitate was filtered followed by drying with a reduced pressure to obtain 7.97 g of a polymer precursor PP-8 (number average molecular weight (Mn): 10,900, weight average molecular weight (Mw): 22,100).

Thereafter, 2.00 g of the obtained polymer precursor PP-8 was dissolved in an aqueous solution of tetraethyl ammonium hydroxide aqueous solution in such a manner that the concentration of the polymer precursor PP-8 was 3.81 percent by mass and the pH thereof was 8.0 to prepare an aqueous solution for pigment dispersion of the polymer precursor PP-8.

Synthesis of Polymer Precursor PP-9

75.9 g (294 mmol) of 1,16-hexadecanediol (manufactured by Tokyo Chemical Industry Co. Ltd.) was dissolved in 200 mL of tetrahydrofuran and thereafter 12.2 g (154 mmol) of pyridine was further added. To this solution, a solution in which 28.0 g (147 mmol) of 2-naphthalene carbonyl chloride (manufacture by Tokyo Chemical Industry Co. Ltd.) was dissolved in 100 ml of tetrahydrofuran was dripped in 30 minutes during stirring followed by stirring at room temperature (25 degrees C.) for six hours. The thus-obtained reaction solution was condensed and methanol was added to the obtained white residue. Thereafter, the liquid mixture was stirred for 30 minutes and filtered. After the obtained white solid was rinsed with water and methanol in this order, the resulting matter was dried with a reduced pressure and refined by silica gel column chromatography with a solvent mixture of a methylene chloride and methanol with a volume ratio of 98:2 serving as an eluent to obtain 43.3 g of 2-naphthoic acid-16-hydroxyhexa decane ester.

Next, 41.4 g (100 mmol) of 2-naphthoic acid-16-hydroxy hexadecane ester was dissolved in 200 mL of dried methylene chloride followed by heating to 40 degrees C.

To this solution, a solution in which 0.019 g (0.030 mmol) of dibutyltin dilaurate was dissolved in 20.0 g (100 mmol) of 2-(2-isocyanatoethoxy)ethyl methacrylate (KARENZ™ MOI-EG, manufactured by Showa Denko K.K.) was dripped during stirring in one hour followed by stirring at 40 degrees C. for 12 hours. Moreover, subsequent to cooling down to room temperature (25 degrees C.), the solvent was distilled away. The residue was refined by silica gel column chromatography with a solvent mixture of a dichloromethane and methanol with a volume ratio of 98:2 serving as an eluent to obtain 43.3 g of a monomer M-4 represented by the following Chemical structure 4-4.

Monomer M-4

Chemical structure 4-4

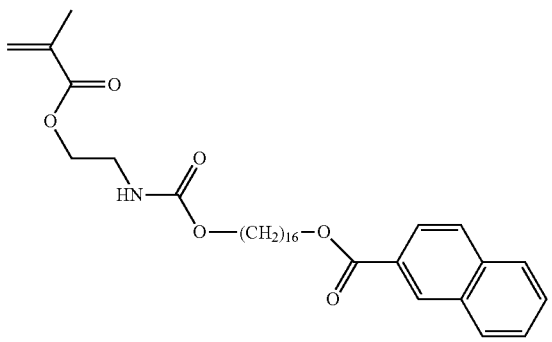

Next, 1.14 g (15.8 mmol) of acrylic acid (manufactured by Tokyo Chemical Industry Co. Ltd.) and 6.91 g (11.3 mmol) of the monomer M-4 were dissolved in 40 mL of methyl ethyl ketone to prepare a monomer solution. The monomer solution was divided into two with a mass ratio of 10 percent to 90 percent. After heating 10 percent by mass of the prepared monomer solution to 75 degrees C. in an argon atmosphere, a solution in which 0.065 g (0.40 mmol) of 2,2'-azoiso(butyronitrile) (manufactured by Tokyo Chemical Industry Co. Ltd.) and 0.013 g (0.13 mmol) of 3-mercapto propionic acid were dissolved in the remaining monomer solution was dripped to the heated solution followed by stirring at 75 degrees C. for four hours. The resulting solution was cooled down to room temperature (25 degrees C.) and the thus-obtained reaction solution was dripped to hexane. The precipitate was filtered followed by drying with a reduced pressure to obtain 7.97 g of a polymer precursor PP-9 (number average molecular weight (Mn): 10,700, weight average molecular weight (Mw): 22,600).

Thereafter, 2.00 g of the obtained polymer precursor PP-9 was dissolved in an aqueous solution of tetraethyl ammonium hydroxide aqueous solution in such a manner that the concentration of the polymer precursor PP-1 was 3.81 percent by mass and the pH thereof was 8.0 to prepare an aqueous solution for pigment dispersion of the polymer precursor PP-9.

Synthesis of Polymer Precursor PP-10

A total of 64 g (19.0 mmol) of methacrylic acid (manufactured by Tokyo Chemical Industry Co. Ltd.) and 6.42 g (13.6 mmol) of monomer M-1 were dissolved in 40 mL of methyl ethyl ketone to prepare a monomer solution. The monomer solution was divided into two with a mass ratio of 10 percent to 90 percent. After heating 10 percent by mass of the prepared monomer solution to 75 degrees C. in an argon atmosphere, a solution in which 0.078 g (0.48 mmol) of 2,2'-azoiso(butyronitrile) (manufactured by Tokyo Chemical Industry Co. Ltd.) and 0.016 g (0.15 mmol) of 3-mercaptopropionic acid were dissolved in the remaining monomer solution was dripped to the heated solution followed by stirring at 75 degrees C. for four hours. The resulting solution was cooled down to room temperature (25 degrees C.) and the thus-obtained reaction solution was dripped to hexane. The precipitate was filtered followed by drying with a reduced pressure to obtain 8.33 g of a polymer precursor PP-10 (number average molecular weight (Mn): 10,400, weight average molecular weight (Mw): 20,900).

Thereafter, 2.00 g of the obtained polymer precursor PP-10 was dissolved in an aqueous solution of tetraethyl ammonium hydroxide aqueous solution in such a manner that the concentration of the polymer precursor PP-10 was 3.81 percent and the pH thereof was 8.0 to prepare an aqueous solution for pigment dispersion of the polymer precursor PP-10.

Synthesis of Polymer Precursor PP-11

A total of 1.07 g (14.8 mmol) of acrylic acid (manufactured by Tokyo Chemical Industry Co. Ltd.) and 7.00 g (14.8 mmol) of monomer M-1 were dissolved in 40 mL of methyl ethyl ketone to prepare a monomer solution. The monomer solution was divided into two with a mass ratio of 10 percent to 90 percent. After heating 10 percent by mass of the prepared monomer solution to 75 degrees C. in an argon atmosphere, a solution in which 0.085 g (0.52 mmol) of 2,2'-azoiso(butyronitrile) (manufactured by Tokyo Chemical Industry Co. Ltd.) and 0.018 g (0.17 mmol) of 3-mercapto propionic acid were dissolved in the remaining monomer solution was dripped to the heated solution followed by stirring at 75 degrees C. for four hours. The resulting solution was cooled down to room temperature (25 degrees C.) and the thus-obtained reaction solution was dripped to hexane. The precipitate was filtered followed by drying with a reduced pressure to obtain 7.94 g of a polymer precursor PP-11 (number average molecular weight (Mn): 10,900, weight average molecular weight (Mw): 20,900).

Thereafter, 2.00 g of the obtained polymer precursor PP-11 was dissolved in an aqueous solution of tetraethyl ammonium hydroxide aqueous solution in such a manner that the concentration of the polymer precursor PP-11 was 3.81 percent by mass and the pH thereof was 8.0 to prepare an aqueous solution for pigment dispersion of the polymer precursor PP-11.

Synthesis of Polymer Precursor PP-12

A total of 1.07 g (14.8 mmol) of acrylic acid (manufactured by Tokyo Chemical Industry Co. Ltd.) and 7.00 g (14.8 mmol) of monomer M-1 were dissolved in 40 mL of methyl ethyl ketone to prepare a monomer solution. The monomer solution was divided into two with a mass ratio of 10 percent to 90 percent. After heating 10 percent by mass of the prepared monomer solution to 75 degrees C. in an argon atmosphere, a solution in which 0.192 g (1.17 mmol) of 2,2'-azoiso(butyronitrile) (manufactured by Tokyo Chemical Industry Co. Ltd.) and 0.040 g (0.37 mmol) of 3-mercapto propionic acid were dissolved in the remaining monomer solution was dripped to the heated solution followed by stirring at 75 degrees C. for four hours. The resulting solution was cooled down to room temperature (25 degrees C.) and the thus-obtained reaction solution was dripped to hexane. The precipitate was filtered followed by drying with a reduced pressure to obtain 7.93 g of a polymer precursor PP-12 (number average molecular weight (Mn): 11,000, weight average molecular weight (Mw): 21,000).

Thereafter, 2.00 g of the obtained polymer precursor PP-12 was dissolved in an aqueous solution of tetraethyl ammonium hydroxide aqueous solution in such a manner that the concentration of the polymer precursor PP-12 was 3.81 percent by mass and the pH thereof was 8.0 to prepare an aqueous solution for pigment dispersion of the polymer precursor PP-12.

Synthesis of Polymer Precursor PP-13

A total of 3.06 g (42.5 mmol) of acrylic acid (manufactured by Tokyo Chemical Industry Co. Ltd.) and 5.01 g (10.6 mmol) of monomer M-1 were dissolved in 40 mL of methyl ethyl ketone to prepare a monomer solution. The monomer solution was divided into two with a mass ratio of 10 percent to 90 percent. After heating 10 percent by mass of the prepared monomer solution to 75 degrees C. in an argon atmosphere, a solution in which 0.218 g (1.33 mmol) of 2,2'-azoiso(butyronitrile) (manufactured by Tokyo Chemical Industry Co. Ltd.) and 0.045 g (0.43 mmol) of 3-mercapto propionic acid were dissolved in the remaining monomer solution was dripped to the heated solution followed by stirring at 75 degrees C. for four hours. The resultant was cooled down to room temperature (25 degrees C.) and the thus-obtained reaction solution was dripped to hexane. The precipitate was filtered followed by drying with a reduced pressure to obtain 7.96 g of a polymer precursor PP-13 (number average molecular weight (Mn): 11,300, weight average molecular weight (Mw): 21,200).

Thereafter, 2.00 g of the obtained polymer precursor PP-13 was dissolved in an aqueous solution of tetraethyl ammonium hydroxide aqueous solution in such a manner that the concentration of the polymer precursor PP-13 was 3.81 percent by mass and the pH thereof was 8.0 to prepare an aqueous solution for pigment dispersion of the polymer precursor PP-13.

Synthesis of Polymer Precursor PP-14

A total of 2.00 g of the polymer precursor PP-6 (number average molecular weight (Mn): 10,200, weight average molecular weight (Mw): 20,500) was dissolved in an aqueous solution of sodium hydroxide in such a manner that the concentration of the polymer precursor PP-6 was 3.81 percent by mass and the pH thereof was 8.0 to prepare an aqueous solution for pigment dispersion of the polymer precursor PP-14.

Synthesis of Polymer Precursor PP-15

A total of 4.07 g (54.6 mmol) of acrylic acid (manufactured by Tokyo Chemical Industry Co. Ltd.) and 3.34 g (5.46 mmol) of monomer M-4 were dissolved in 40 mL of methyl ethyl ketone to prepare a monomer solution. The monomer solution was divided into two with a mass ratio of 10 percent to 90 percent. After heating 10 percent by mass of the prepared monomer solution to 75 degrees C. in an argon atmosphere, a solution in which 0.247 g (0.40 mmol) of 2,2'-azoiso(butyronitrile) (manufactured by Tokyo Chemical Industry Co. Ltd.) and 0.510 g (4.80 mmol) of 3-mercapto propionic acid were dissolved in the remaining monomer solution was dripped to the heated solution followed by stirring at 75 degrees C. for four hours. The resulting solution was cooled down to room temperature (25 degrees C.) and the thus-obtained reaction solution was dripped to hexane. The precipitate was filtered followed by drying with a reduced pressure to obtain 7.92 g of a polymer precursor PP-15 (number average molecular weight (Mn): 9,800, weight average molecular weight (Mw): 20,800).

Thereafter, 2.00 g of the obtained polymer precursor PP-15 was dissolved in an aqueous solution of sodium hydroxide in such a manner that the concentration of the polymer precursor PP-15 was 3.81 percent by mass and the pH thereof was 8.0 to prepare an aqueous solution for pigment dispersion of the polymer precursor PP-15.

Synthesis of Comparative Polymer Precursor rPP-1

A total of 7.4 g of methacrylic acid (manufactured by Tokyo Chemical Industry Co., Ltd.), 6.6 g of styrene (manufactured by TOKYO CHEMICAL INDUSTRY CO., LTD.), 4.0 g of styrene macromer (AS-6S, manufactured by TOA-GOSEI CO., LTD.), and 4.0 g of polypropylene glycol monomethacrylate (BLEMMER® PP-800, manufactured by NOF Corporation) were mixed to prepare a monomer liquid mixture. In a reaction vessel, 2.0 g of methyl ethyl ketone, 0.03 g of 2-mercaptoethanol, and 10 percent by mass of the monomer liquid mixture were mixed and sufficiently replaced with argon gas. To a dropping funnel, the remaining monomer liquid mixture, 6.0 g of methyl ethyl ketone, 0.027 g of 2-mercaptoethanol, and 0.22 g of 2,2'-azobis(2,4-dimethylvaleronitrile) (V-65, manufactured by Wako Pure Chemical Industries, Ltd.) were added. The monomer liquid mixture in the reaction vessel was heated to 65 degrees C. during stirring and the liquid mixture in the dropping funnel was dropped to the reaction vessel in 3 hours in an argon atmosphere. After allowing to stand at 65 degrees C. for two hours, a solution in which 0.03 g of the V-65 mentioned above was dissolved in 0.5 g of methyl ethyl ketone was added to the resulting material followed by aging at 65 degrees C. for two hours and 70 degrees C. for two hours. The resulting matter was cooled down to room temperature (25 degrees C.) and the thus-obtained reaction solution was dripped to hexane. The precipitate was filtered followed by drying with a reduced pressure to obtain 21.02 g of a comparative polymer precursor rPP-1 (number average molecular weight (Mn): 11,500, weight average molecular weight (Mw): 21,800).

Thereafter, the thus-obtained 2.50 g of the comparative polymer precursor rPP-1 was added to 7.86 g of methyl ethyl ketone and 0.51 g of a 5N aqueous solution of sodium hydroxide (manufactured by Wako Pure Chemical Industries, Ltd.) was added in such a manner that the ratio of the number of moles of the sodium hydroxide to the number of moles of carboxy groups in the polymer precursor rPP-1 was 20 percent to complete neutralization. Thereafter, deionized water was added in such a manner that the concentration of the comparative polymer precursor rPP-1 was 3.81 percent by mass to prepare an aqueous solution for a pigment dispersion of the comparative polymer precursor rPP-1.

Synthesis of Comparative Polymer Precursor rPP-2

7.40 g of methacrylic acid (manufactured by TOKYO CHEMICAL INDUSTRY CO., LTD.), 6.60 g of benzyl methacrylate (manufactured by TOKYO CHEMICAL INDUSTRY CO., LTD.), 4.00 g of styrene macromer (AS-6S, manufactured by TOAGOSEI CO., LTD.), and 4.00 g of polypropylene glycol monomethacrylate (BLEMMER® PP-800, manufactured by NOF Corporation) were mixed to prepare a monomer liquid mixture. In a reaction vessel, 2.00 g of methyl ethyl ketone, 0.03 g of 2-mercaptoethanol, and 10 percent by mass of the monomer liquid mixture were mixed and sufficiently replaced with argon gas. To a dropping funnel, the remaining monomer mixture, 0.027 g of 2-mercaptoethanol, 6.00 g of methyl ethyl ketone, and 0.22 g of 2,2'-azobis (2,4-dimethylvaleronitrile) (V-65, manufactured by Wako Pure Chemical Industries, Ltd.) were added. A total of 20.44 g of a comparative polymer precursor rPP-2 (number average molecular weight (Mn): 12,500 and weight average molecular weight (Mw): 22,500) was obtained in the same manner as in the method of preparing the comparative polymer precursor rPP-1 described above.

Thereafter, the thus-obtained 2.50 g of the comparative polymer precursor rPP-2 was added to 7.86 g of methyl ethyl ketone and 1.02 g of a 5N aqueous solution of potassium hydroxide (manufactured by Wako Pure Chemical Industries, Ltd.) was added in such a manner that the ratio of the number of moles of the sodium hydroxide to the number of moles of carboxy groups in the polymer precursor rPP-2 was 40 percent to complete neutralization. Thereafter, deionized water was added in such a manner that the concentration of the comparative polymer precursor rPP-2 was 3.81 percent by mass to prepare an aqueous solution for a pigment dispersion of the comparative polymer precursor rPP-2

Synthesis of Comparative Polymer Precursor rPP-3

11.40 g of methacrylic acid (manufactured by TOKYO CHEMICAL INDUSTRY CO., LTD.), 2.60 g of benzyl methacrylate (manufactured by TOKYO CHEMICAL INDUSTRY CO., LTD.), 4.00 g of styrene macromer (AS-6S, manufactured by TOAGOSEI CO., LTD.), and 4.00 g of polypropylene glycol monomethacrylate (BLEMMER® PP-800, manufactured by NOF Corporation) were mixed to prepare a monomer liquid mixture. In a reaction vessel, 2.00 g of methyl ethyl ketone, 0.03 g of 2-mercaptoethanol, and 10 percent by mass of the monomer liquid mixture were mixed and sufficiently replaced with argon gas. To a dropping funnel, the remaining monomer mixture, 0.027 g of 2-mercaptoethanol, 6.00 g of methyl ethyl ketone, and 0.22 g of 2,2'-azobis (2,4-dimethylvaleronitrile) (V-65, manufactured by Wako Pure Chemical Industries, Ltd.) were added. A total of 0.44 g of a comparative polymer precursor rPP-3 (number average molecular weight (Mn): 12,500 and weight average molecular weight (Mw): 22,600) was obtained in the same manner as in the method of preparing the comparative polymer precursor rPP-1 described above.

Thereafter, the thus-obtained 2.50 g of the comparative polymer precursor rPP-3 was added to 7.86 g of methyl ethyl ketone and 1.02 g of a 5N aqueous solution of sodium hydroxide (manufactured by Wako Pure Chemical Industries, Ltd.) was added in such a manner that the ratio of the number of moles of the sodium hydroxide to the number of moles of carboxy groups in the polymer precursor rPP-3 was 40 percent to complete neutralization. Thereafter, deionized water was added in such a manner that the concentration of the comparative polymer precursor rPP-3 was 3.81 percent by mass to prepare an aqueous solution for a pigment dispersion of the comparative polymer precursor rPP-3.

Example 1

Preparation of Pigment Dispersion PD-1

0.32 parts by mass of 3-glycidyloxypropyl (dimethoxy) methylsilane was added to 84.0 parts by mass of the aqueous solution of the polymer precursor PP-1 followed by stirring for 30 minutes. Thereafter, 16.0 parts by mass of carbon black (NIPEX150, manufactured by Orion Engineered Carbons SA) was added followed by stirring for 12 hours. The thus-obtained mixture was circulated and dispersed at a peripheral speed of 10 m/s for one hour using a disk-type bead mill (KDL type, manufactured by Shinmaru Enterprises Corporation, using zirconia balls having a diameter of 0.1 mm). Thereafter, the liquid dispersion was taken out from the dispersing device and stirred at 70 degrees C. for four hours.

Next, the liquid dispersion was filtered through a membrane filter having an average pore size of 5.0 μm (Minisart™, manufactured by Sartorius Stedim Biotech S.A.) and an abla,ance of deionized water was added to obtain 95.0 parts by mass of the pigment dispersion PD-1 (pigment solid content concentration: 16 percent by mass).

Preparation of Ink GJ-1

A total of 45.0 parts by mass of the pigment dispersion PD-1, 10.0 parts by mass of 1,3-butanediol, 10.0 parts by mass of glycerin, 10.0 parts by mass of 3-methoxy-N,N-diemthyl propionamide, 1.0 part by mass of fluorochemical surfactant (ZONYL™ FS-300, solid portion concentration: 40 percent by mass, manufactured by E.I. du Pont de Nemours and Company), and 24.0 parts by mass of deionized water were mixed followed by stirring for one hour and filtration by a membrane filter (DISMIC™, -25 cs Cellulose Acetate 0.80 μm, manufactured by Toyo Roshi Kaisha, Ltd.) having an pore diameter of 0.8 μm to obtain an ink GJ-1.

Example 2

Preparation of Pigment Dispersion PD-2

A total of 0.32 parts by mass of 3-glycidyloxypropyl (diethoxy) methylsilane was added to 84.0 parts by mass of the aqueous solution of the polymer precursor PP-1 followed by stirring for 30 minutes. Thereafter, 16.0 parts by mass of carbon black (NIPEX150, manufactured by Orion Engineered Carbons SA) was added followed by stirring for 12 hours. The thus-obtained mixture was circulated and dispersed at a peripheral speed of 10 m/s for one hour using a disk-type bead mill (KDL type, manufactured by Shinmaru Enterprises Corporation, using zirconia balls having a diameter of 0.1 mm). Thereafter, the liquid dispersion was taken out from the dispersing device and stirred at 70 degrees C. for four hours.

Next, the liquid dispersion was filtered through a membrane filter having an average pore size of 5.0 μm (Minisart™, manufactured by Sartorius Stedim Biotech S.A.) and an a balance of deionized water was added to obtain 95.0 parts by mass of the pigment dispersion PD-2 (pigment solid content concentration: 16 percent by mass).

Preparation of Ink GJ-2

A total of 45.0 parts by mass of the pigment dispersion PD-2, 10.0 parts by mass of 1,3-butanediol, 10.0 parts by mass of glycerin, 10.0 parts by mass of 3-methoxy-N,N-diemthyl propionamide, 1.0 part by mass of fluorochemical surfactant (ZONYL™ FS-300, solid portion concentration: 40 percent by mass, manufactured by E.I. du Pont de Nemours and Company), and 24.0 parts by mass of deionized water were mixed followed by stirring for one hour and filtration by a membrane filter (DISMIC™, -25 cs Cellulose Acetate 0.80 μm, manufactured by Toyo Roshi Kaisha, Ltd.) having an pore diameter of 0.8 μm to obtain an ink GJ-2.

Example 3

Preparation of Pigment Dispersion PD-3

A total of 95.0 parts by mass of a pigment dispersion PD-3 (concentration of solid content of pigment: 16 percent by mass) was obtained in the same manner as in Example 1 except that 84.0 parts by mass of the aqueous solution of the polymer precursor PP-3 was used in place of 84.0 parts by mass of the aqueous solution of the polymer precursor PP-1.

Preparation of Ink GJ-3

An ink GJ-3 was obtained in the same manner as in Example 1 except that 45.0 parts by mass of the pigment dispersion PD-3 was used instead of 45.0 parts of the pigment dispersion PD-1.

Example 4

Preparation of Pigment Dispersion PD-4

A total of 95.0 parts by mass of a pigment dispersion PD-4 (concentration of solid content of pigment: 16 percent by mass) was obtained in the same manner as in Example 2 except that 84.0 parts by mass of the aqueous solution of the polymer precursor PP-4 was used in place of 84.0 parts by mass of the aqueous solution of the polymer precursor PP-2.

Preparation of Ink GJ-4

An ink GJ-4 was obtained in the same manner as in Example 2 except that 45.0 parts by mass of the pigment dispersion PD-4 was used instead of 45.0 parts of the pigment dispersion PD-2.

Examples 5 to 15

Preparation of Pigment Dispersions PD-5 to PD-15

A total of 95.0 parts by mass of pigment dispersion of each of PD-5 to PD-15 (concentration of solid content of pigment: 16 percent by mass) was obtained in the same manner as in Example 1 except that 84.0 parts by mass of the aqueous solution of the polymer precursor of each of PD-5 to PD-15 was used in place of 84.0 parts by mass of the aqueous solution of the polymer precursor PP-1.

Preparation of Inks GJ5 to 15

Inks GJ-5 to GJ-15 were obtained in the same manner as in Example 1 except that 45.0 parts by mass of the respective pigment dispersions PD-5 to PD-15 was used instead of 45.0 parts of the pigment dispersion PD-1.

Example 16

Preparation of Pigment Dispersion PD-16

A total of 0.064 parts by mass of 3-glycidyloxypropyl (diethoxy) methylsilane was added to 84.0 parts by mass of the aqueous solution of the polymer precursor PP-5 followed by stirring for 30 minutes. Thereafter, 16.0 parts by mass of carbon black (NIPEX170, manufactured by Orion Engineered Carbons SA) was added followed by stirring for 12 hours. The thus-obtained mixture was circulated and dispersed at a peripheral speed of 10 m/s for one hour using a disk-type bead mill (KDL type, manufactured by Shinmaru Enterprises Corporation, using zirconia balls having a diameter of 0.1 mm). Thereafter, the liquid dispersion was taken out from the dispersing device and stirred at 70 degrees C. for four hours.

Next, the liquid dispersion was filtered through a membrane filter having an average pore size of 5.0 μm (Minisart™, manufactured by Sartorius Stedim Biotech S.A.) and an a balance of deionized water was added to obtain 95.0 parts by mass of the pigment dispersion PD-16 (pigment solid content concentration: 16 percent by mass).

Preparation of Ink GJ-16

A total of 45.0 parts by mass of the pigment dispersion PD-16, 10.0 parts by mass of 1,3-butanediol, 10.0 parts by mass of glycerin, 10.0 parts by mass of 3-methoxy-N,N-diemthyl propionamide, 1.0 part by mass of fluorochemical surfactant (ZONYL™ FS-300, solid portion concentration: 40 percent by mass, manufactured by E.I. du Pont de Nemours and Company), and 24.0 parts by mass of deionized water were mixed followed by stirring for one hour and filtration by a membrane filter (DISMIC™, -25 cs Cellulose Acetate 0.80 μm, manufactured by Toyo Roshi Kaisha, Ltd.) having an pore diameter of 0.8 μm to obtain an ink GJ-16.

Example 17

Preparation of Pigment Dispersion PD-17

A total of 95.0 parts by mass of a pigment dispersion PD-17 (pigment solids content: 16 percent by mass) was obtained in the same manner as in Example 16 except that 0.32 parts by mass of 3-glycidyloxypropyl (diethoxy) methylsilane was used.

Preparation of Ink GJ-1

An ink GJ-17 was obtained in the same manner as in Example 16 except that 45.0 parts by mass of the pigment dispersion RPD-17 was used instead of 45.0 parts by mass of the pigment dispersion PD-16.

Example 18

Preparation of Pigment Dispersion PD-18

A total of 95.0 parts by mass of a pigment dispersion PD-18 (pigment solids content: 16 percent by mass) was obtained in the same manner as in Example 16 except that 0.96 parts by mass of 3-glycidyloxypropyl (diethoxy) methylsilane was used.

Preparation of Ink GJ-18

Thereafter, ink GJ-18 was obtained in the same manner as in Example 16 except that 45.0 parts by mass of the pigment dispersion RPD-18 was used instead of 45.0 parts by mass of the pigment dispersion PD-16.

Example 19

Preparation of Pigment Dispersion PD-19

A total of 0.16 parts by mass of 3-glycidyloxypropyl (dimethoxy) methylsilane was added to 84.0 parts by mass of the aqueous solution of the polymer precursor PP-6 followed by stirring for 30 minutes. Thereafter, 16.0 parts by mass of carbon black (NIPEX170, manufactured by Orion Engineered Carbons SA) was added followed by stirring for 12 hours. The thus-obtained mixture was circulated and dispersed at a peripheral speed of 10 m/s for one hour using a disk-type bead mill (KDL type, manufactured by Shinmaru Enterprises Corporation, using zirconia balls having a diameter of 0.1 mm). Thereafter, the liquid dispersion was taken out from the dispersing device and stirred at 70 degrees C. for four hours.

Next, the liquid dispersion was filtered through a membrane filter having an average pore size of 5.0 μm (Minisart™, manufactured by Sartorius Stedim Biotech S.A.) and a balance of deionized water was added to obtain 95.0 parts by mass of the pigment dispersion PD-19 (pigment solid content concentration: 16 percent by mass).

Preparation of Ink GJ-19

A total of 45.0 parts by mass of the pigment dispersion PD-19, 10.0 parts by mass of 1,3-butanediol, 10.0 parts by mass of glycerin, 10.0 parts by mass of 3-methoxy-N,N-diemthyl propionamide, 1.0 part by mass of fluorochemical surfactant (ZONYL™ FS-300, solid portion concentration: 40 percent by mass, manufactured by E.I. du Pont de Nemours and Company), and 24.0 parts by mass of deionized water were mixed followed by stirring for one hour and filtration by a membrane filter (DISMIC™, −25 cs Cellulose Acetate 0.80 μm, manufactured by Toyo Roshi Kaisha, Ltd.) having an pore diameter of 0.8 μm to obtain an ink GJ-19.

Example 20

Preparation of Pigment Dispersion PD-20

A total of 95.0 parts by mass of a pigment dispersion PD-20 (pigment solids content: 16 percent by mass) was obtained in the same manner as in Example 19 except that 0.64 parts by mass of 3-glycidyloxypropyl (dimethoxy) methylsilane was used.

Preparation of Ink GJ-20

An ink GJ-20 was obtained in the same manner as in Example 19 except that 45.0 parts by mass of the pigment dispersion RPD-20 was used instead of 45.0 parts by mass of the pigment dispersion PD-19.

Example 21

Preparation of Pigment Dispersion PD-21

A total of 0.16 parts by mass of 3-glycidyloxypropyl (dimethoxy) methylsilane was added to 84.0 parts by mass of the aqueous solution of the polymer precursor PP-14 followed by stirring for 30 minutes. Thereafter, 16.0 parts by mass of carbon black (NIPEX170, manufactured by Orion Engineered Carbons SA) was added followed by stirring for 12 hours. The thus-obtained mixture was circulated and dispersed at a peripheral speed of 10 m/s for one hour using a disk-type bead mill (KDL type, manufactured by Shinmaru Enterprises Corporation, using zirconia balls having a diameter of 0.1 mm). Thereafter, the liquid dispersion was taken out from the dispersing device and stirred at 70 degrees C. for four hours.

Next, the liquid dispersion was filtered through a membrane filter having an average pore size of 5.0 μm (Minisart™, manufactured by Sartorius Stedim Biotech S.A.) and a balance of deionized water was added to obtain 95.0 parts by mass of the pigment dispersion PD-21 (pigment solid content concentration: 16 percent by mass).

Preparation of Ink GJ-21

A total of 45.0 parts by mass of the pigment dispersion PD-21, 10.0 parts by mass of 1,3-butanediol, 10.0 parts by mass of glycerin, 10.0 parts by mass of 3-methoxy-N,N-diemthyl propionamide, 1.0 part by mass of fluorochemical surfactant (ZONYL™ FS-300, solid portion concentration: 40 percent by mass, manufactured by E.I. du Pont de Nemours and Company), and 24.0 parts by mass of deionized water were mixed followed by stirring for one hour and filtration by a membrane filter (DISMIC™, −25 cs Cellulose Acetate 0.80 μm, manufactured by Toyo Roshi Kaisha, Ltd.) having an pore diameter of 0.8 μm to obtain an ink GJ-21.

Example 22

Preparation of Pigment Dispersion PD-22

A total of 95.0 parts by mass of a pigment dispersion PD-22 (concentration of pigment solids content: 16 percent by mass) was obtained in the same manner as in Example 21 except that 0.64 parts by mass of 3-glycidyloxypropyl (dimethoxy) methylsilane was used.

Preparation of Ink GJ-22

An ink GJ-22 was obtained in the same manner as in Example 22 except that 45.0 parts by mass of the pigment dispersion PD-22 was used instead of 45.0 parts by mass of the pigment dispersion PD-21.

Comparative Example 1

Preparation of Comparative Pigment Dispersion rPD-1

16.0 parts by mass of carbon black (NIPEX150, manufactured by Orion Engineered Carbons SA) was added to 84.0 parts by mass of the aqueous solution of the comparative polymer precursor rPP-1 and the mixture was stirred for 12 hours. The thus-obtained mixture was circulated and dispersed at a peripheral speed of 10 m/s for one hour using a disk-type bead mill (KDL type, manufactured by Shinmaru Enterprises Corporation, using zirconia balls having a diameter of 0.1 mm). Thereafter, the liquid dispersion was taken out from the dispersing device.

A total of 0.58 g of trimethylolpropane polyglycidyl ether (Denacol EX-321, manufactured by Nagase Chemtech Co., Ltd.) was added to the obtained dispersion, sealed, and stirred at 70 degrees C. for five hours. Subsequent to cooling, the liquid dispersion was filtered through a membrane filter having an average pore size of 5.0 μm (Minisart™, manufactured by Sartorius Stedim Biotech S.A.) and an a balance of deionized water was added to obtain 95.0 parts by mass of a comparative pigment dispersion rPD-1 (pigment solid content concentration: 16 percent by mass).

Preparation of Comparative Ink rGJ-1

A total of 45.0 parts by mass of the pigment dispersion rPD-1, 10.0 parts by mass of 1,3-butanediol, 10.0 parts by mass of glycerin, 10.0 parts by mass of 3-methoxy-N,N-diemthyl propionamide, 1.0 part by mass of fluorochemical surfactant (ZONYL™ FS-300, solid portion concentration: 40 percent by mass, manufactured by E.I. du Pont de Nemours and Company), and 24.0 parts by mass of deionized water were mixed followed by stirring for one hour and filtration by a membrane filter (DISMIC™, −25 cs Cellulose Acetate 0.80 μm, manufactured by Toyo Roshi Kaisha, Ltd.) having an pore diameter of 0.8 μm to obtain a comparative ink GJ-1.

Comparative Example 2

Preparation of Comparative Pigment Dispersion rPD-2

A total of 16.0 parts by mass of carbon black (NIPEX170, manufactured by Orion Engineered Carbons SA) was added to 84.0 parts by mass of the aqueous solution of the comparative polymer precursor rPP-2 and the mixture was stirred for 12 hours. The thus-obtained mixture was circulated and dispersed at a peripheral speed of 10 m/s for one hour using a disk-type bead mill (KDL type, manufactured by Shinmaru Enterprises Corporation, using zirconia balls having a diameter of 0.1 mm). Thereafter, the liquid dispersion was taken out from the dispersing device.

0.48 g of trimethylolpropane polyglycidyl ether (Denacol EX-321, manufactured by Nagase Chemtech Co., Ltd.) was added to the obtained dispersion, sealed, and stirred at 70 degrees C. for five hours. Subsequent to cooling, the liquid dispersion was filtered through a membrane filter having an average pore size of 5.0 μm (Minisart™, manufactured by Sartorius Stedim Biotech S.A.) and an a balance of deionized water was added to obtain 95.0 parts by mass of a comparative pigment dispersion rPD-2 (pigment solid content concentration: 16 percent by mass).

Preparation of Comparative Ink rGJ-2

A total of 45.0 parts by mass of the pigment dispersion rPD-2, 10.0 parts by mass of 1,3-butanediol, 10.0 parts by mass of glycerin, 10.0 parts by mass of 3-methoxy-N,N-diemthyl propionamide, 1.0 part by mass of fluorochemical surfactant (ZONYL™ FS-300, solid portion concentration: 40 percent by mass, manufactured by E.I. du Pont de Nemours and Company), and 24.0 parts by mass of deionized water were mixed followed by stirring for one hour and filtration by a membrane filter (DISMIC™, −25 cs Cellulose Acetate 0.80 μm, manufactured by Toyo Roshi Kaisha, Ltd.) having an pore diameter of 0.8 μm to obtain a comparative ink rGJ-2.

Comparative Example 3

Preparation of Comparative Pigment Dispersion rPD-3

16.0 parts by mass of carbon black (NIPEX170, manufactured by Orion Engineered Carbons SA) was added to 84.0 parts by mass of the aqueous solution of the comparative polymer precursor rPP-3 and the mixture was stirred for 12 hours. The thus-obtained mixture was circulated and dispersed at a peripheral speed of 10 m/s for one hour using a disk-type bead mill (KDL type, manufactured by Shinmaru Enterprises Corporation, using zirconia balls having a diameter of 0.1 mm). Thereafter, the liquid dispersion was taken out from the dispersing device.

0.58 g of trimethylolpropane polyglycidyl ether (Denacol EX-321, manufactured by Nagase Chemtech Co., Ltd.) was added to the obtained dispersion, sealed, and stirred at 70 degrees C. for five hours. Subsequent to cooling, the liquid dispersion was filtered through a membrane filter having an average pore size of 5.0 μm (Minisart™, manufactured by Sartorius Stedim Biotech S.A.) and an a balance of deionized water was added to obtain 95.0 parts by mass of a comparative pigment dispersion rPD-3 (pigment solid content concentration: 16 percent by mass).

Preparation of Comparative Ink rGJ-3

A total of 45.0 parts by mass of the pigment dispersion rPD-2, 10.0 parts by mass of 1,3-butanediol, 10.0 parts by mass of glycerin, 10.0 parts by mass of 3-methoxy-N,N-diemthyl propionamide, 1.0 part by mass of fluorochemical surfactant (ZONYL™ FS-300, solid portion concentration: 40 percent by mass, manufactured by E.I. du Pont de Nemours and Company), and 24.0 parts by mass of deionized water were mixed followed by stirring for one hour and filtration by a membrane filter (DISMIC™, −25 cs Cellulose Acetate 0.80 μm, manufactured by Toyo Roshi Kaisha, Ltd.) having an pore diameter of 0.8 μm to obtain a comparative ink rGJ-3.

Properties of each ink prepared in Examples and Comparative Examples were evaluated in the following manner. The results are shown in Table 1.

Storage Stability of Ink

An ink cartridge was filled with each ink and stored at 70 degrees C. for one week. The change ratio was obtained from the following relationship and evaluated according to the following criteria.

Change rate of viscosity (percent)=(Viscosity of ink after storage−viscosity of ink before storage)/viscosity of ink before storage×100

Viscosity was measured by a viscometer (RE80L, manufactured by TOKI SANGYO CO., LTD.) to measure the viscosity of the ink at 25 degrees C. at 50 rotations.

Evaluation Criteria

A: Change ratio of viscosity within the range of from −5 percent to +5 percent

B: Change ratio of viscosity within the range of from −8 percent to less than −5 percent and more than 5 percent to 8 percent C: Change ratio of viscosity within the range of from −10 percent to less than −8 percent and more than 8 percent to 10 percent.

D: Change ratio of viscosity within the range of from less than −10 percent to −30 percent and more than 10 percent to 30 percent E: Change ratio of viscosity less than −30 percent or greater than 30 percent (gelated, evaluation was not possible)

Image Density

An inkjet printer (IPSiO GX5000) was filled with each ink at 23 degrees C. and 50 percent RH. A chart including general symbols of 64 point JIS X 0208 (1997), 2223 created by utilizing Microsoft Word 2000 (manufactured by Microsoft Corporation) was printed on coated paper (Lumi-Art Glos 130) followed by drying at 100 degrees C. in a thermostatic chamber for 2 minutes within 5 seconds. The coated paper was left undone for 24 hours. The symbol portion on image surface was measured by X-Rite 938 (manufactured by X-Rite Inc.) and evaluated according to the following criteria.

The printing mode was: a modified mode in which "Gloss Paper—beautiful" was modified to "no color calibration" from a user setting by a driver installed onto the printer.

The symbol according to JIS X 0208 (1997), 2223 includes a square for the exterior with the inside thereof entirely printed with ink.

Evaluation Criteria

A: 2.3 or higher

B: 2.10 to less than 2.30

M (Marginal): 2.0 to less than 2.10

D: 1.80 to less than 2.00

C: 1.80 or less

Discharging Stability

An inkjet printer (IPSiO GXe5000, manufactured by Ricoh Co., Ltd.) was loaded with the aqueous ink obtained as described above and printed all over solid on coated paper (LumiArt Gloss 130) in the "gloss paper fast" mode. The 100th printed matter was visually observed and the number of white lines (corresponding to the number of nozzles that did not discharge the ink) was counted. Next, after the nozzle cleaning, a solid image was printed with a run length of 100 and again the 100th printed matter was visually checked. The number of white lines appearing on the printed matter was measured per discharging nozzle width to evaluate dischargeability according to the following criteria.

Evaluation Criteria

A: No white line did not appear on 100th printed matter and 200th printed mater

B: Two or less white lines appeared on 100th printed matter and 200th printed matter C: 3 to 5 white lines appeared on 100th or 200th printed matter D: 6 or more white lines appeared on 100th or 200th printed matter

TABLE 1

| | | Ink | Pigment dispersion | Polymer precursor Compound represented by Chemical structure 5 |
|---|---|---|---|---|
| Example | 1 | GJ-1 | PD-1 | PP-1 |
| | 2 | GJ-2 | PD-2 | PP-2 |
| | 3 | GJ-3 | PD-3 | PP-3 |
| | 4 | GJ-4 | PD-4 | PP-4 |
| | 5 | GJ-5 | PD-5 | PP-5 |
| | 6 | GJ-6 | PD-6 | PP-6 |
| | 7 | GJ-7 | PD-7 | PP-7 |
| | 8 | GJ-8 | PD-8 | PP-8 |
| | 9 | GJ-9 | PD-9 | PP-9 |
| | 10 | GJ-10 | PD-10 | PP-10 |
| | 11 | GJ-11 | PD-11 | PP-11 |
| | 12 | GJ-12 | PD-12 | PP-12 |
| | 13 | GJ-13 | PD-13 | PP-13 |
| | 14 | GJ-14 | PD-14 | PP-14 |
| | 15 | GJ-15 | PD-15 | PP-15 |
| | 16 | GJ-16 | PD-16 | PP-5 |
| | 17 | GJ-17 | PD-17 | PP-5 |
| | 18 | GJ-18 | PD-18 | PP-5 |
| | 19 | GJ-19 | PD-19 | PP-6 |
| | 20 | GJ-20 | PD-20 | PP-6 |
| | 21 | GJ-21 | PD-21 | PP-14 |
| | 22 | GJ-22 | PD-22 | PP-14 |
| Comparative Example | 1 | rGJ-1 | rPD-1 | rPP-1 |
| | 2 | rGJ-2 | rPD-2 | rPP-2 |
| | 3 | rGJ-3 | rPD-3 | rPP-3 |

| | | Compound represented by Chemical structure 4 | | | | |
|---|---|---|---|---|---|---|
| | | $R_2$ | Amount [%] to Chemical structure 5 | Storage stability | Image density | Discharge-ability |
| Example | 1 | —CH$_3$ | 10 | B | A | A |
| | 2 | —C$_2$H$_5$ | 10 | B | A | A |
| | 3 | —CH$_3$ | 10 | B | A | A |
| | 4 | —C$_2$H$_5$ | 10 | B | A | A |
| | 5 | —CH$_3$ | 10 | B | A | A |
| | 6 | —CH$_3$ | 10 | A | A | A |
| | 7 | —CH$_3$ | 10 | A | A | A |
| | 8 | —CH$_3$ | 10 | A | A | A |
| | 9 | —CH$_3$ | 10 | A | A | A |
| | 10 | —CH$_3$ | 10 | A | A | A |
| | 11 | —CH$_3$ | 10 | A | A | A |
| | 12 | CH$_3$ | 10 | A | A | A |
| | 13 | —CH$_3$ | 10 | A | A | A |
| | 14 | —CH$_3$ | 10 | A | A | A |
| | 15 | —CH$_3$ | 10 | A | A | A |
| | 16 | —C$_2$H$_5$ | 2 | A | B | B |
| | 17 | —C$_2$H$_5$ | 10 | A | A | A |
| | 18 | —C$_2$H$_5$ | 30 | A | A | A |
| | 19 | —CH$_3$ | 5 | A | A | A |
| | 20 | —CH$_3$ | 20 | A | A | A |
| | 21 | —CH$_3$ | 5 | A | A | A |
| | 22 | —CH$_3$ | 20 | A | A | A |
| Comparative Example | 1 | — | — | D | C | B |
| | 2 | — | — | C | C | A |
| | 3 | — | — | C | C | A |

Numerous additional modifications and variations are possible in light of the above teachings. It is therefore to be understood that, within the scope of the above teachings, the present disclosure may be practiced otherwise than as specifically described herein. With some embodiments having thus been described, it will be obvious that the same may be varied in many ways. Such variations are not to be regarded as a departure from the scope of the present disclosure and appended claims, and all such modifications are intended to be included within the scope of the present disclosure and appended claims.

What is claimed is:

1. An ink, comprising:
water;
a pigment; and
a polymer having a structure unit represented by the following Chemical structure 1,

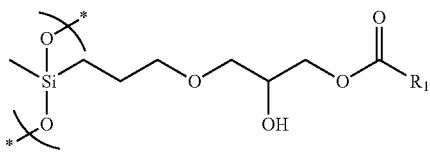

Chemical structure 1 where $R_1$ represents an organic group having at least carbon and oxygen.

2. The ink according to claim 1, wherein $R_1$ has a structure unit represented by the following Chemical structure 2,

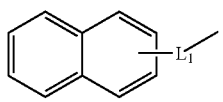

Chemical structure 2 where $L_1$ represents —O—, —CO—, —OC(=O)— (naphthalene side) or —NHCO— (naphthalene side).

3. The ink according to claim 1, wherein $R_1$ has a structure unit represented by the following Chemical structure 3,

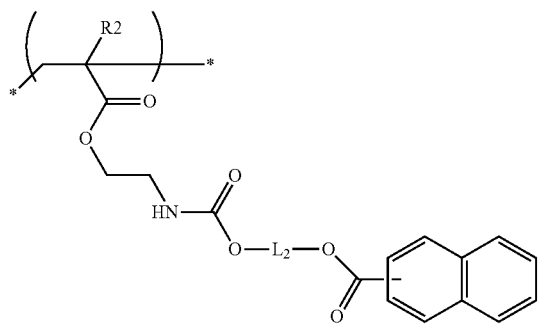

Chemical structure 3 where $L_2$ represents an alkylene group having 2 to 18 carbon atoms and $R_2$ represents a hydrogen atom or a methyl group.

4. An ink accommodating unit, comprising:
a container; and
the ink of claim 1 contained in the container.

5. A recording method, comprising:
discharging the ink of claim 1 to a recording medium to form an image thereon.

6. A recording device, comprising:
an ink accommodating unit comprising a container and the ink of claim 1 contained in the container; and
a discharging device configured to discharge the ink of claim 1 accommodated in the ink accommodating unit to a recording medium.

7. A method of manufacturing an ink, comprising:
mixing water, a compound represented by the following Chemical structure 4, a compound represented by the following Chemical structure 5, and a pigment to react the compound represented by the following Chemical structure 4 and the compound represented by the following Chemical structure 5, to obtain the ink comprising water, a pigment, and a polymer having a structure unit represented by the following Chemical structure 1,

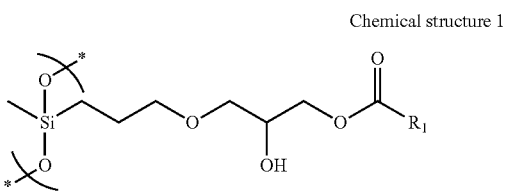

Chemical structure 1 where $R_1$ represents an organic group having at least carbon and oxygen,

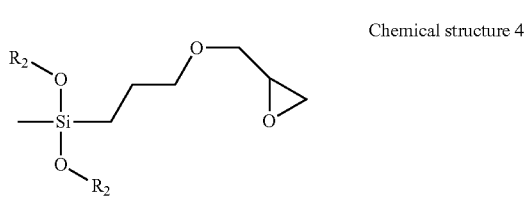

Chemical structure 4 where $R_2$ represents a methyl group or an ethyl group,

Chemical structure 5 where $R_1$ represents an organic group having at least carbon and oxygen.

8. The method according to claim 7, wherein, in the mixing, a proportion of the compound represented by the Chemical structure 4 to the compound represented by the Chemical structure 5 is from 1 to 40 percent by mass.

9. The method according to claim 7, wherein, in the mixing, a proportion of the compound represented by the Chemical structure 4 to the compound represented by the Chemical structure 5 is from 5 to 20 percent by mass.

10. The method according to claim 7, wherein the compound represented by Chemical structure 4 is 3-glycidyloxypropyl (dimethoxy) methylsilane.

11. The ink according to claim 1, wherein a proportion of the polymer in the ink is in a range from 0.1 to 10 percent by mass.

12. The ink according to claim 1, wherein a proportion of the pigment in the ink is in a range from 0.1 to 15 percent by mass.

13. The ink according to claim 1, wherein a proportion of the water in the ink is in a range from 10 to 90 percent by mass.

14. The ink according to claim 1, further comprising a resin.

15. The ink according to claim 14, wherein the resin is selected from the group consisting of urethane resin, polyester resin, acrylic-based resin, vinyl acetate-based resin, styrene-based resin, butadiene-based resin, styrene-butadiene-based resin, vinylchloride-based resin, acrylic styrene-based resin, and acrylic silicone-based resin.

16. The ink according to claim 1, further comprising an organic solvent.

17. The ink according to claim 1, further comprising at least one additive selected from the group consisting of a surfactant, a defoaming agent, a preservative, a fungicide, a corrosion inhibitor, and a pH regulator.

18. The ink according to claim 17, wherein the surfactant is selected from the group consisting of a silicone-based surfactant, a fluorochemical surfactant, an amphoteric surfactant, a nonionic surfactant, an anionic surfactant, and a mixture thereof.

* * * * *